US012555871B2

(12) United States Patent
Jin et al.

(10) Patent No.: US 12,555,871 B2
(45) Date of Patent: Feb. 17, 2026

(54) BATTERY CELL, BATTERY, ELECTRIC APPARATUS, AND ENERGY STORAGE APPARATUS

(71) Applicant: CONTEMPORARY AMPEREX TECHNOLOGY CO., LIMITED, Ningde (CN)

(72) Inventors: Haizu Jin, Ningde (CN); Heyang Liu, Ningde (CN); Jiang Liu, Ningde (CN); Limei Yang, Ningde (CN); Rui Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/291,617

(22) Filed: Aug. 6, 2025

(65) Prior Publication Data

US 2025/0364639 A1   Nov. 27, 2025

Related U.S. Application Data

(63) Continuation of application No. PCT/CN2024/100756, filed on Jun. 21, 2024.

(30) Foreign Application Priority Data

Jun. 21, 2023 (WO) ................ PCT/CN2023/101943

(51) Int. Cl.
*H01M 50/103* (2021.01)
*H01M 4/58* (2010.01)
(Continued)

(52) U.S. Cl.
CPC ....... *H01M 50/474* (2021.01); *H01M 4/5825* (2013.01); *H01M 10/0431* (2013.01);
(Continued)

(58) Field of Classification Search
CPC ............ H01M 50/103; H01M 4/5825; H01M 10/0587; H01M 50/15; H01M 50/169;
(Continued)

(56) References Cited

U.S. PATENT DOCUMENTS

| 6,333,124 B1 | 12/2001 | Moriwaki et al. |
| 2015/0037616 A1* | 2/2015 | Wyatt ............... H01M 10/6555 429/153 |

(Continued)

FOREIGN PATENT DOCUMENTS

| CN | 102800895 A | 11/2012 |
| CN | 212810407 U | 3/2021 |

(Continued)

OTHER PUBLICATIONS

The First Office Action received in the counterpart CN Application No. 202321602756.4, dated Oct. 16, 2023, 4 pages with English translation.

(Continued)

*Primary Examiner* — Lisa S Park
(74) *Attorney, Agent, or Firm* — K&L Gates LLP

(57) ABSTRACT

A battery cell, a battery, an electric apparatus, and an energy storage apparatus are provided. The battery cell includes a housing and at least one electrode assembly positioned within the housing. The housing is a right parallelepiped defined by three mutually perpendicular dimensions: W1, T1, and H1. The housing comprises six walls, arranged in opposite pairs along each direction. The combined thicknesses of the two opposite walls in each direction are denoted as a, b, and c, respectively. The ratio of usable internal volume to total external volume, defined as $(W1-a)\cdot(T1-b)\cdot(H1-c)/(W1\cdot T1\cdot H1)$, is not less than 90%. This structural configuration increases the volumetric energy density of the battery cell using the same chemical system.

20 Claims, 14 Drawing Sheets

(51) Int. Cl.
  *H01M 10/04* (2006.01)
  *H01M 10/0587* (2010.01)
  *H01M 50/119* (2021.01)
  *H01M 50/15* (2021.01)
  *H01M 50/169* (2021.01)
  *H01M 50/474* (2021.01)
  *H01M 50/538* (2021.01)
  *H01M 50/55* (2021.01)
  *B60L 50/64* (2019.01)

(52) U.S. Cl.
  CPC ..... *H01M 10/0587* (2013.01); *H01M 50/103* (2021.01); *H01M 50/119* (2021.01); *H01M 50/15* (2021.01); *H01M 50/169* (2021.01); *H01M 50/538* (2021.01); *H01M 50/55* (2021.01); *B60L 50/64* (2019.02); *H01M 2220/20* (2013.01)

(58) Field of Classification Search
  CPC .............. H01M 50/474; H01M 50/55; H01M 2220/20; B60L 50/64
  See application file for complete search history.

(56) References Cited

U.S. PATENT DOCUMENTS

| | | | |
|---|---|---|---|
| 2016/0155995 A1 | 6/2016 | Takahata | |
| 2016/0380299 A1 | 12/2016 | Umeyama et al. | |
| 2019/0393556 A1* | 12/2019 | Matsuoka | H01M 10/425 |
| 2020/0365838 A1 | 11/2020 | Chen | |
| 2021/0305549 A1* | 9/2021 | Bertry | H01M 4/136 |
| 2022/0336838 A1 | 10/2022 | Wu et al. | |
| 2023/0067969 A1 | 3/2023 | Zhai et al. | |
| 2023/0112577 A1 | 4/2023 | Sekiguchi et al. | |
| 2025/0023207 A1* | 1/2025 | Yuan | H01M 50/54 |

FOREIGN PATENT DOCUMENTS

| | | | |
|---|---|---|---|
| CN | 113169410 A | | 7/2021 |
| CN | 216750083 U | | 6/2022 |
| CN | 217134614 | * | 8/2022 |
| CN | 217134614 U | | 8/2022 |
| CN | 217158413 U | | 8/2022 |
| CN | 115066802 A | | 9/2022 |
| CN | 217768698 U | | 11/2022 |
| CN | 115498372 A | | 12/2022 |
| CN | 115775907 A | | 3/2023 |
| CN | 218827727 U | | 4/2023 |
| CN | 219067069 U | | 5/2023 |
| CN | 116207412 A | | 6/2023 |
| CN | 220527038 U | | 2/2024 |
| JP | 2000030673 A | | 1/2000 |
| JP | 2000195750 A | | 7/2000 |
| JP | 2013-097900 | * | 5/2013 |
| JP | 2019192519 A | | 10/2019 |
| JP | 2020126734 A | | 8/2020 |
| JP | 2021034134 A | | 3/2021 |
| KR | 20120028257 A | | 3/2012 |
| WO | WO2019/190385 | * | 10/2019 |
| WO | WO2021/184262 | * | 9/2021 |

OTHER PUBLICATIONS

The Grant Notice received in the counterpart CN Application No. 202321602756.4, dated Nov. 24, 2023, 2 pages with English translation.

The International Search Report received in the counterpart International Application No. PCT/CN2023/10194, dated Mar. 8, 2024, 5 pages with English translation.

The ISA Written Opinion received in the counterpart International Application No. PCT/CN2023/10194, dated Mar. 8, 2024, 8 pages with English translation.

The International Search Report received in the counterpart International Application No. PCT/CN2024/100754, dated Sep. 9, 2024, 7 pages with English translation.

The ISA Written Opinion received in the counterpart International Application No. PCT/CN2024/100754, dated Sep. 9, 2024, 10 pages with English translation.

The International Search Report received in the counterpart International Application No. PCT/CN2024/100756, dated Sep. 9, 2024, 6 pages with English translation.

The ISA Written Opinion received in the counterpart International Application No. PCT/CN2024/100756, dated Sep. 9, 2024, 10 pages with English translation.

The International Search Report received in the counterpart International Application No. PCT/CN2024/100764, dated Sep. 2, 2024, 6 pages with English translation.

The ISA Written Opinion received in the counterpart International Application No. PCT/CN2024/100764, dated Sep. 2, 2024, 10 pages with English translation.

Office Action (with English Machine Translation), mailed Oct. 12, 2025, for corresponding Chinese Patent Application Serial No. 202480001332.3.

Non-Final Office Action, mailed Nov. 6, 2025, for U.S. Appl. No. 19/280,137.

Non-Final Office Action, mailed Sep. 5, 2025, for U.S. Appl. No. 19/262,145.

* cited by examiner

BATTERY CELL, BATTERY, ELECTRIC APPARATUS, AND ENERGY STORAGE APPARATUS

CROSS-REFERENCE TO RELATED APPLICATIONS

This application is a continuation of International Application No. PCT/CN2024/100756, filed on Jun. 21, 2024, which claims priority to International Application PCT/CN2023/101943 filed on Jun. 21, 2023, and entitled "BATTERY CELL, BATTERY, ELECTRIC APPARATUS, AND ENERGY STORAGE APPARATUS", which is incorporated herein by reference in its entirety.

TECHNICAL FIELD

This application relates to the field of battery technologies, and specifically to a battery cell, a battery, an electric apparatus, and an energy storage apparatus.

BACKGROUND

With the development of new energy technologies, batteries find increasingly wide applications, such as in mobile phones, notebook computers, electric scooters, electric vehicles, energy storage apparatuses, electric aircraft, electric ships, electric toy cars, electric toy ships, electric toy aircraft, and electric tools.

In the development of battery technologies, how to increase the volumetric energy density of battery cells remains an urgent issue to be addressed in battery technologies.

SUMMARY

Embodiments of this application provide a battery cell, a battery, an electric apparatus, and an energy storage apparatus, so as to effectively increase the volumetric energy density of the battery cell.

According to a first aspect, embodiments of this application provide a battery cell including: a housing, where the housing is a right parallelepiped, a size of the housing in a first direction being $W_1$, a size of the housing in a second direction being $T_1$, a size of the housing in a third direction being $H_1$, and the first direction, the second direction, and the third direction being mutually perpendicular; and at least one electrode assembly, where the electrode assembly is accommodated within the housing. The housing includes a first wall and a second wall disposed opposite each other along the first direction, a third wall and a fourth wall disposed opposite each other along the second direction, and a fifth wall and a sixth wall disposed opposite each other along the third direction, a sum of thicknesses of the first wall and the second wall being a, a sum of thicknesses of the third wall and the fourth wall being b, and a sum of thicknesses of the fifth wall and the sixth wall being c, satisfying: $(W_1-a)*(T_1-b)*(H_1-c)/(W_1*T_1*H_1) \geq 90\%$.

In the above technical solution, setting a ratio of an internal volume of the housing to a volume of the housing at 90% or higher increases an internal space of the housing, allowing the housing to accommodate a larger electrode assembly and more electrolyte, thereby increasing the volumetric energy density of the battery cell under the same chemical material system.

In some embodiments, $(W_1-a)/W_1 \geq 97.0\%$, $(T_1-b)/T_1 \geq 96.5\%$, and $(H_1-c)/H_1 \geq 96.5\%$. This can increase proportions of the internal space of the housing in three directions, further enhancing the volumetric energy density of the battery cell.

In some embodiments, the housing includes a housing body and an end cap, the housing body having an opening, and the end cap covering the opening; where the housing body includes the first wall, the second wall, the third wall, the fourth wall, and the fifth wall formed integrally, and the end cap is the sixth wall.

In some embodiments, the battery cell further includes a first insulating member and a second insulating member, the first insulating member being disposed between the fifth wall and the electrode assembly and abutting against the fifth wall; and the second insulating member being disposed between the sixth wall and the electrode assembly and abutting against the sixth wall; where a maximum size of the first insulating member in the third direction is $d_1$, and a maximum size of the second insulating member in the third direction is $d_2$, satisfying: $(W_1-a-1.6 \text{ mm})*(T_1-b-1.6 \text{ mm})*(H_1-c-d_1-d_2)/(W_1*T_1*H_1) \geq 88\%$, $0.3 \text{ mm} \leq d_1 \leq 1.2 \text{ mm}$, and $2 \text{ mm} \leq d_2 \leq 10 \text{ mm}$. This increases a space within the housing available for the electrode assembly, allowing placement of a larger electrode assembly, thereby further enhancing the volumetric energy density of the battery cell.

In some embodiments, the battery cell further includes a first insulating member and a second insulating member, the first insulating member being disposed between the fifth wall and the electrode assembly and abutting against the fifth wall; and the second insulating member being disposed between the sixth wall and the electrode assembly and abutting against the sixth wall; where a maximum size of the first insulating member in the third direction is $d_1$, and a maximum size of the second insulating member in the third direction is $d_2$, satisfying: $(W_1-a-4 \text{ mm})*(T_1-b-4 \text{ mm})*(H_1-c-d_1-d_2)/(W_1*T_1*H_1) \geq 85\%$, $0.3 \text{ mm} \leq d_1 \leq 1.2 \text{ mm}$, and $2 \text{ mm} \leq d_2 \leq 10 \text{ mm}$.

In some embodiments, the housing includes a housing body and two end caps, the housing body having two openings disposed opposite each other along the third direction, and the two end caps respectively covering the openings on corresponding sides; where the housing body includes the first wall, the second wall, the third wall, and the fourth wall formed integrally, and the two end caps are the fifth wall and the sixth wall, respectively.

In some embodiments, the battery cell further includes a third insulating member and a fourth insulating member, the third insulating member being disposed between the fifth wall and the electrode assembly and abutting against the fifth wall; and the fourth insulating member being disposed between the sixth wall and the electrode assembly and abutting against the sixth wall; where a maximum size of the third insulating member in the third direction is $d_3$, and a maximum size of the fourth insulating member in the third direction is $d_4$, satisfying: $(W_1-a-1.6 \text{ mm})*(T_1-b-1.6 \text{ mm})*(H_1-c-d_3-d_4)/(W_1*T_1*H_1) \geq 88\%$, $2 \text{ mm} \leq d_3 \leq 10 \text{ mm}$, and $2 \text{ mm} \leq d_4 \leq 10 \text{ mm}$.

In some embodiments, the battery cell further includes a third insulating member and a fourth insulating member, the third insulating member being disposed between the fifth wall and the electrode assembly and abutting against the fifth wall; and the fourth insulating member being disposed between the sixth wall and the electrode assembly and abutting against the sixth wall; where a maximum size of the third insulating member in the third direction is $d_3$, and a maximum size of the fourth insulating member in the third direction is $d_4$, satisfying: $(W_1-a-4 \text{ mm})*(T_1-b-4 \text{ mm})*(H_1-c-d_3-d_4)/(W_1*T_1*H_1) \geq 85\%$, 2 mm$\leq d_3 \leq$10 mm, and 2 mm$\leq d_4 \leq$10 mm.

In some embodiments, 3000 cm$^3 \leq W_1*T_1*H_1 \leq$40000 cm$^3$. First, this ensures that when the ratio of the internal volume of the housing to the volume thereof is 90% or higher, the wall thickness of the housing is not excessively small, thereby meeting requirements for structural strength and rigidity of the housing. Second, this can control a capacity and current of the battery cell within appropriate ranges, reducing heat generation of the battery cell and lowering a risk of damage to circuit components.

In some embodiments, 3200 cm$^3 \leq W_1*T_1*H_1 \leq$32000 cm$^3$.

In some embodiments, 3720 cm$^3 \leq W_1*T_1*H_1 \leq$12500 cm$^3$.

In some embodiments, 4000 cm$^3 \leq W_1*T_1*H_1 \leq$6000 cm$^3$.

In some embodiments, the electrode assembly includes a body and tabs extending from the body. The body is a flat structure, a maximum size of the body in the first direction being $W_2$, a maximum size of the body in the second direction being $T_2$, and a maximum size of the body in the third direction being $H_2$, satisfying: $(W_2*T_2*H_2)/(W_1*T_1*H_1) \geq 80\%$. This allows the electrode assembly to fully utilize the internal space of the housing, avoiding a situation where the housing has a large internal volume but the electrode assembly has a small volume, thereby increasing the volumetric energy density of the battery cell and reducing movement of the electrode assembly within the housing.

In some embodiments, $W_2/(W_1-a) \geq 91.5\%$, $T_2/(T_1-b) \geq 93.2\%$, and $H_2/(H_1-c) \geq 94.0\%$.

In some embodiments, the electrode assembly is a wound structure, and the body includes a flat region, a first bent region, and a second bent region, along the first direction, the first bent region and the second bent region being located at two ends of the flat region, respectively; where the first bent region includes a plurality of first bent portions arranged in layers, along the first direction, a distance between an inner vertex of an innermost first bent portion and an outer vertex of an outermost first bent portion among the plurality of first bent portions being $W_3$; the second bent region includes a plurality of second bent portions arranged in layers, along the first direction, a distance between an inner vertex of an innermost second bent portion and an outer vertex of an outermost second bent portion among the plurality of second bent portions being $W_4$; and $(W_3+W_4)/W_2 \leq 30\%$ is satisfied. This reduces proportions of sizes of the first bent region and the second bent region in the first direction, increasing a proportion of a size of the flat region in the first direction, thereby reducing a volume proportion of a gap between the bent regions and an inner surface of the housing. This improves effective utilization of the internal space of the housing and enhances the volumetric energy density of the battery cell.

In some embodiments, materials of the first wall, the second wall, the third wall, the fourth wall, the fifth wall, and the sixth wall all include an aluminum alloy, the aluminum alloy including components with the following mass percentages: aluminum$\geq$96.7%, 0.05%$\leq$copper$\leq$0.2%, iron$\leq$0.7%, manganese$\leq$1.5%, silicon$\leq$0.6%, zinc$\leq$0.1%, any other single element component$\leq$0.05%, and a total of other element components$\leq$0.15%. This can provide an aluminum alloy with higher strength, and using this aluminum alloy as a material for the housing can significantly enhance an ability of the housing to resist impact, improving reliability of the battery cell.

In some embodiments, the housing includes a housing body and an end cap, the housing body having an opening, the end cap covering the opening, and the end cap being welded to the housing body. The housing body includes the first wall, the second wall, the third wall, the fourth wall, and the fifth wall formed integrally, and the end cap is the sixth wall. The thickness of the first wall and the thickness of the second wall both are $a_1$, the thickness of the third wall and the thickness of the fourth wall both are $b_1$, the thickness of the fifth wall is $c_1$, and the thickness of the sixth wall is $c_2$, satisfying: $c_2 > c_1$, $c_1 > a_1$, and $c_1 > b_1$.

In some embodiments, 0.5 mm$\leq a_1 \leq$1.5 mm, 0.5$\leq b_1 \leq$1.5 mm, 1.0 mm$\leq c_1 \leq$2.5 mm, and 1.5 mm$\leq c_2 \leq$4 mm.

In some embodiments, the battery cell includes electrode terminals, the electrode terminals being disposed on the end cap or the fifth wall, and the electrode terminals being electrically connected to the electrode assembly.

In some embodiments, $(W_1-2*a_1)*(T_1-2*b_1)*(H_1-c_1-c_2)/(W_1*T_1*H_1) \geq 95\%$.

In some embodiments, the housing includes a housing body and two end caps, the housing body having two openings disposed opposite each other along the third direction, and the two end caps respectively covering the openings on corresponding sides. The end caps are welded to the housing body. The housing body includes the first wall, the second wall, the third wall, and the fourth wall formed integrally, and the two end caps are the fifth wall and the sixth wall, respectively. The thickness of the first wall and the thickness of the second wall both are $a_1$, the thickness of the third wall and the thickness of the fourth wall both are $b_1$, the thickness of the fifth wall is $c_1$, and the thickness of the sixth wall is $c_2$, satisfying: $c_2 = c_1$, $c_1 > a_1$, and $c_1 > b_1$.

In some embodiments, 0.5 mm$\leq a_1 \leq$1.5 mm, 0.5$\leq b_1 \leq$1.5 mm, and 1.5 mm$\leq c_2 \leq$4 mm.

In some embodiments, the battery cell includes electrode terminals, the electrode terminals being disposed on the end caps, and the electrode terminals being electrically connected to the electrode assembly.

In some embodiments, $(W_1-2*a_1)*(T_1-2*b_1)*(H_1-2*c_1)/(W_1*T_1*H_1) \geq 95\%$.

In some embodiments, $T_1 < W_1$, $T_1 < H_1$, $2 \leq W_1/T_1 \leq 10$, $2 \leq H_1/T_1 \leq 10$, and $0.7 \leq W_1/H_1 \leq 1.6$.

In some embodiments, 40 mm$\leq T_1 \leq$150 mm.

In some embodiments, the third direction is parallel to a direction of gravity, and the battery cell includes an electrolyte, where 120 mm$\leq H_1 \leq$400 mm.

In some embodiments, 150 mm$\leq W_1 \leq$1500 mm.

In some embodiments, a positive electrode material of the battery cell includes lithium-containing phosphate, and a capacity of the battery cell is C, satisfying: C$\geq$350 Ah, and $C/((W_1-a)*(T_1-b)*(H_1-c)) \geq$118 Ah/L.

In some embodiments, a positive electrode material of the battery cell includes a lithium transition metal oxide, and a capacity of the battery cell is C, satisfying: C$\geq$650 Ah, and $C/((W_1-a)*(T_1-b)*(H_1-c)) \geq$190 Ah/L.

In some embodiments, the battery cell is a sodium-ion battery, and a capacity of the battery cell is C, satisfying: C$\geq$260 Ah, and $C/((W_1-a)*(T_1-b)*(H_1-c)) \geq$87 Ah/L.

According to a second aspect, the embodiments of this application provide a battery including a battery casing and the battery cell provided in any embodiment of the first aspect, the battery cell being accommodated within the battery casing.

According to a third aspect, the embodiments of this application provide an electric apparatus including the battery provided in any embodiment of the second aspect.

According to a fourth aspect, embodiments of this application provide an energy storage apparatus including an energy storage casing and a plurality of battery cells provided in any embodiment of the first aspect, the energy storage casing including a battery compartment, and the plurality of battery cells being accommodated within the battery compartment.

In some embodiments, the battery cell includes electrode terminals, the electrode terminals being disposed on the housing. A sum of volumes of the housings of the plurality of battery cells is $V_1$, and a volume of the battery compartment is $V_2$, satisfying: $0.5 \leq V_1/V_2 \leq 0.95$. This can increase a space utilization rate of the energy storage apparatus, allowing more battery cells to be arranged within the battery compartment of the energy storage casing, that is, arranging more energy-providing structures per unit space. Therefore, this can increase the energy density and enhance the capacity without expanding an occupied space.

DESCRIPTION OF DRAWINGS

To more clearly illustrate technical solutions of embodiments of this application, drawings required for use in the embodiments are briefly introduced below. The following drawings only illustrate some embodiments of this application and should not be regarded as limiting the scope. For those of ordinary skill in the art, other related drawings may be obtained based on these drawings without creative effort.

Figure 1:
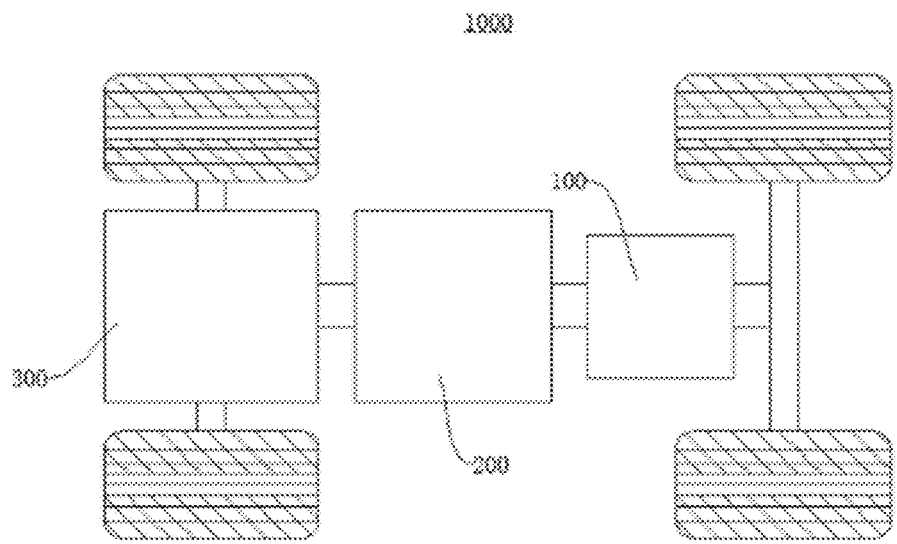
FIG. 1 is a schematic structural diagram of a vehicle according to some embodiments of this application.

Reference signs: 1—housing; 11—housing body; 12—end cap; 101—first wall; 102—second wall; 103—third wall; 104—fourth wall; 105—fifth wall; 106—sixth wall; 121—positive electrode terminal; 122—negative electrode terminal; 141—first insulating member; 142—second insulating member; 143—third insulating member; 144—fourth insulating member; 2—electrode assembly; 21—body; 22—positive electrode tab; 23—negative electrode tab; 24—positive electrode plate; 25—negative electrode plate; 26—separator; 10—battery cell; 20—battery casing; 201—first portion; 202—second portion; 100—battery; 200—controller; 300—motor; 400—energy storage casing; 401—battery compartment; 402—electrical compartment; 403—column; 404—battery bracket; 1000—vehicle; 2000—energy storage apparatus; A—flat region; B1—first bent region; B2—second bent region; X—first direction; Y—second direction; and Z—third direction.

DETAILED DESCRIPTION

To make the objectives, technical solutions, and advantages of embodiments of this application clearer, technical solutions in the embodiments of this application are described clearly below with reference to drawings in the embodiments of this application. The described embodiments are a portion of the embodiments of this application, not all embodiments. Based on the embodiments in this application, all other embodiments obtained by those of ordinary skill in the art without creative effort fall within the protection scope of this application.

Unless otherwise defined, all technical and scientific terms used in this application have the same meanings as commonly understood by those skilled in the technical field of this application; terms used in the specification of this application are only for the purpose of describing specific embodiments and are not intended to limit this application; terms "including" and "having" and any variations thereof in the specification, claims, and descriptions of the drawings of this application are intended to cover non-exclusive inclusion. In the specification, claims, or accompanying drawings of this application, the terms "first", "second", and the like are intended to distinguish between different objects rather than to describe a particular order or a primary-secondary relationship.

Reference to "embodiments" in this application means that specific features, structures, or characteristics described in connection with the embodiments may be included in at least one embodiment of this application. Appearance of this phrase in various locations in the specification does not necessarily refer to the same embodiment, nor is it an independent or alternative embodiment mutually exclusive with other embodiments.

In embodiments of this application, identical reference numerals denote identical components, and for brevity, detailed descriptions of identical components are omitted in different embodiments. The term "plurality" appearing in this application refers to more than two (including two).

In this application, the battery cell may include a lithium-ion secondary battery, a lithium-ion primary battery, a lithium-sulfur battery, a sodium-lithium-ion battery, a sodium-ion battery, or a magnesium-ion battery, and embodiments of this application are not limited thereto.

The battery mentioned in embodiments of this application refers to a single physical module including one or more battery cells to provide higher voltage and capacity. For example, the battery mentioned in this application may include a battery module, a battery pack, or the like. The battery generally includes a battery casing for enclosing one or more battery cells. The battery casing can prevent liquids or other foreign objects from affecting charging or discharging of the battery cell.

The battery cell includes a housing, an electrode assembly, and an electrolyte, the housing being configured to accommodate the electrode assembly and the electrolyte. The electrode assembly consists of a positive electrode plate, a negative electrode plate, and a separator. The battery cell operates primarily by movement of metal ions between the positive electrode plate and the negative electrode plate. The positive electrode plate includes a positive electrode current collector and a positive electrode active material layer, the positive electrode active material layer being coated on a surface of the positive electrode current collector, a portion of the positive electrode current collector not coated with the positive electrode active material layer protruding from a portion of the positive electrode current collector coated with the positive electrode active material layer, the portion of the positive electrode current collector not coated with the positive electrode active material layer serving as a positive electrode tab. Taking a lithium-ion battery as an example, a material of the positive electrode current collector may be aluminum, and a positive electrode active material may be lithium cobalt oxide, lithium iron phosphate, ternary lithium, or lithium manganate. The negative electrode plate includes a negative electrode current collector and a negative electrode active material layer, the negative electrode active material layer being coated on a surface of the negative electrode current collector, a portion of the negative electrode current collector not coated with the negative electrode active material layer protruding from a portion of the negative electrode current collector coated with the negative electrode active material layer, the portion of the negative electrode current collector not coated with the negative electrode active material layer serving as a negative electrode tab. A material of the negative electrode current collector may be copper, and a negative electrode active material may be carbon or silicon. To ensure passage of a large current without melting, a number of positive electrode tabs is plural and stacked together, and a number of negative electrode tabs is plural and stacked together. The separator may be made of PP (polypropylene, polypropylene), PE (polyethylene, polyethylene), or the like. Additionally, the electrode assembly may be a wound structure or a laminated structure, and embodiments of this application are not limited thereto.

The battery cell may further include electrode terminals, the electrode terminals being disposed on the housing, the electrode terminals being configured to electrically connect to tabs of the electrode assembly to output electrical energy of the battery cell. The electrode terminals may be directly connected to the tabs, for example, the electrode terminals being directly welded to the tabs. The electrode terminals may alternatively be indirectly connected to the tabs, for example, the electrode terminals being indirectly connected to the tabs via a current collecting member. The current collecting member may be a metal conductor, such as copper, iron, aluminum, steel, or an aluminum alloy.

Development of battery technology must consider multiple design factors simultaneously, such as safety, cycle life, discharge capacity, charge-discharge rate, and other performance parameters. Additionally, volumetric energy density is also an important parameter for evaluating battery performance.

In a battery cell, to enhance safety and reduce a risk of housing rupture when the battery cell is subjected to external impact or when internal pressure of the battery cell is high, the housing is typically designed to be thicker. However, a thicker housing reduces an internal space of the housing. Furthermore, to reduce a likelihood of an internal short circuit in the battery cell, some insulating members are usually disposed inside the housing, and these insulating members inevitably occupy a portion of the space, leaving very limited space for the electrode assembly, resulting in a lower volumetric energy density of the battery cell. For a battery cell with a larger volume, especially one with a volume of 3000 $cm^3$ or more, due to a large mass of the electrode assembly and a greater impact force on the housing, the housing must bear a larger load, so a wall thickness of the housing is typically designed to be thicker, making the problem of low volumetric energy density in large-volume battery cells even more pronounced.

In view of this, embodiments of this application provide a battery cell in which a ratio of an internal volume of the housing to a volume of the housing is 90% or higher, thereby increasing an internal space of the housing to accommodate a larger electrode assembly and more electrolyte, allowing the volumetric energy density of the battery cell to be increased under the same chemical material system.

The battery cell described in the embodiments of this application is applicable to a battery and an electric apparatus using the battery.

The electric apparatus may be vehicles, mobile phones, portable devices, notebook computers, ships, spacecrafts, electric toys, electric tools, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, and an electric toy airplane. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

The following embodiments, for convenience of description, take an electric apparatus as a vehicle as an example.

Referring to FIG. 1, FIG. 1 is a schematic structural diagram of a vehicle 1000 according to some embodiments of this application. A battery 100 is disposed inside the vehicle 1000, the battery 100 being disposable at a bottom, head, or tail of the vehicle 1000. The battery 100 may be configured to supply power to the vehicle 1000. For example, the battery 100 may be used as an operational power supply for the vehicle 1000.

The vehicle 1000 may further include a controller 200 and a motor 300, the controller 200 being configured to control the battery 100 to supply power to the motor 300, for example, for operational power requirements during startup, navigation, and driving of the vehicle 1000.

In some embodiments of this application, the battery 100 may not only serve as an operational power supply for the vehicle 1000 but also as a driving power supply for the vehicle 1000, replacing or partially replacing fuel or natural gas to provide driving power for the vehicle 1000.

Figure 2:
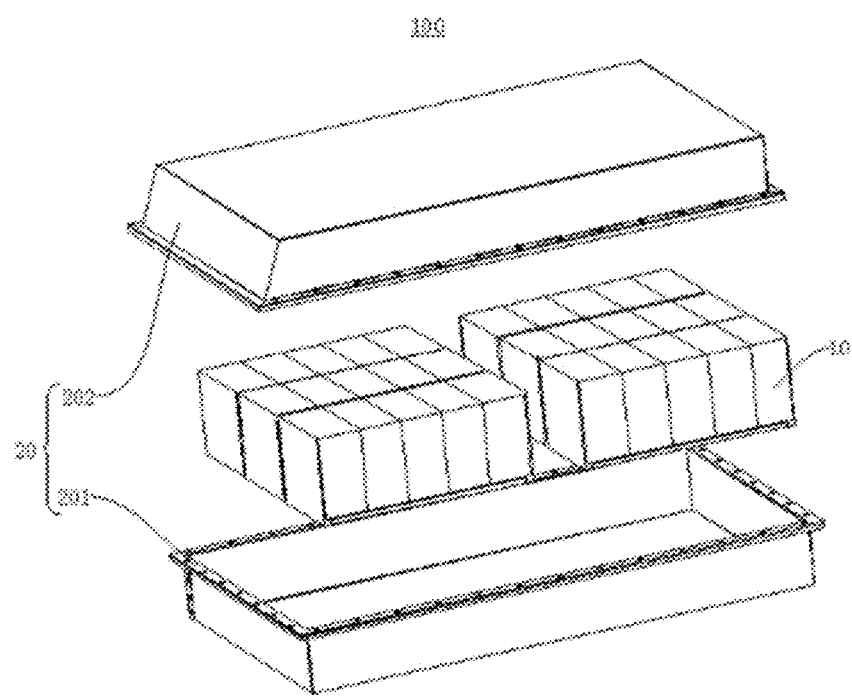
FIG. 2 is an exploded view of a battery according to some embodiments of this application.

Referring to FIG. 2, FIG. 2 is an exploded view of a battery 100 according to some embodiments of this application. The battery 100 includes a battery cell 10 and a battery casing 20, the battery cell 10 being accommodated within the battery casing 20.

The battery casing 20 is a component that accommodates the battery cell 10, the battery casing 20 providing an accommodating space for the battery cell 10, the battery casing 20 being configurable in various structures. In some embodiments, the battery casing 20 may include a first portion 201 and a second portion 202, the first portion 201 and the second portion 202 covering each other to define an accommodating space for accommodating the battery cell 10. The first portion 201 and the second portion 202 may have various shapes, such as a cuboid or a cylinder. The first portion 201 may be a hollow structure open on one side, the second portion 202 may also be a hollow structure open on one side, an open side of the second portion 202 covering an open side of the first portion 201 to form the battery casing 20 with an accommodating space. Alternatively, the first portion 201 may be a hollow structure open on one side, the second portion 202 may be a plate-like structure, the second portion 202 covering an open side of the first portion 201 to form the battery casing 20 with an accommodating space. The first portion 201 and the second portion 202 may be sealed by a sealing element, the sealing element being a sealing ring, a sealing adhesive, or the like.

There may be one or more battery cells 10 in the battery 100. If a plurality of battery cells 10 are present, the plurality of battery cells 10 may be connected in series, parallel, or series and parallel, being connected in series and parallel meaning a combination of series and parallel connections of the plurality of battery cells 10. A plurality of battery cells 10 may first be connected in series, parallel, or a combination thereof to form a battery module, and a plurality of battery modules may then be connected in series, parallel, or a combination thereof to form a unified whole accommodated within the battery casing 20. Alternatively, all battery cells 10 may be directly connected in series, parallel, or a combination thereof, and a unified whole formed by all battery cells 10 may be accommodated within the battery casing 20.

In some embodiments, the battery 100 may further include a busbar component (not shown in the figure), electrical connection between the plurality of battery cells 10 being achievable through the busbar component to realize series, parallel, or series-parallel connection of the plurality of battery cells 10. The busbar component may be a metal conductor, such as copper, iron, aluminum, stainless steel, or an aluminum alloy.

The battery cell described in the embodiments of this application is also applicable to an energy storage apparatus.

The role of energy storage apparatuses in future energy application scenarios is becoming increasingly prominent. On one hand, in new energy power generation, wind and solar power generation exhibit intermittency and instability, and introducing energy storage apparatuses can effectively suppress power fluctuations in power generation, thereby improving power quality. On the other hand, energy storage apparatuses can also perform "peak shaving and valley filling", that is, absorbing excess power from a grid during low output power periods and supplying power to the grid during peak output power periods. This can significantly reduce the peak power of the grid, enhancing power demand-side management capabilities, and promoting the application of renewable energy.

Figure 3:
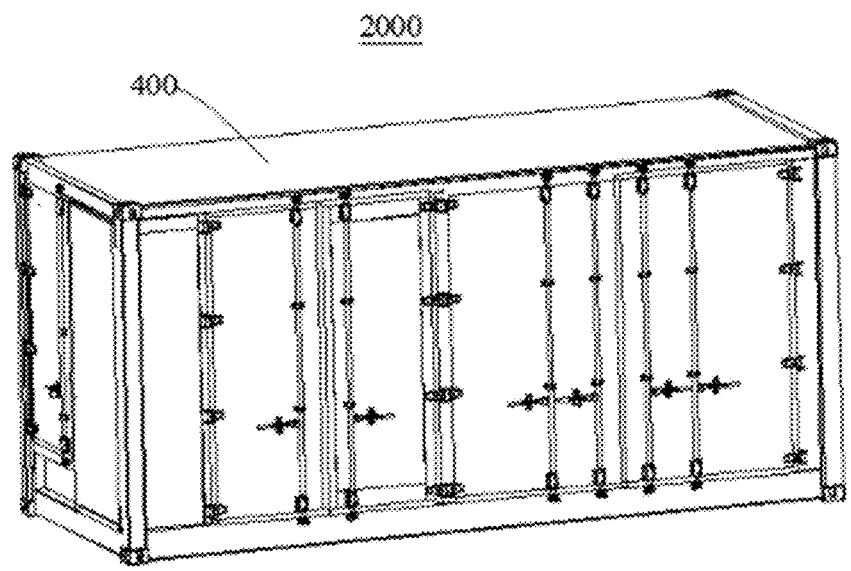
FIG. 3 is a schematic structural diagram of an energy storage apparatus according to some embodiments of this application.
Figure 4:
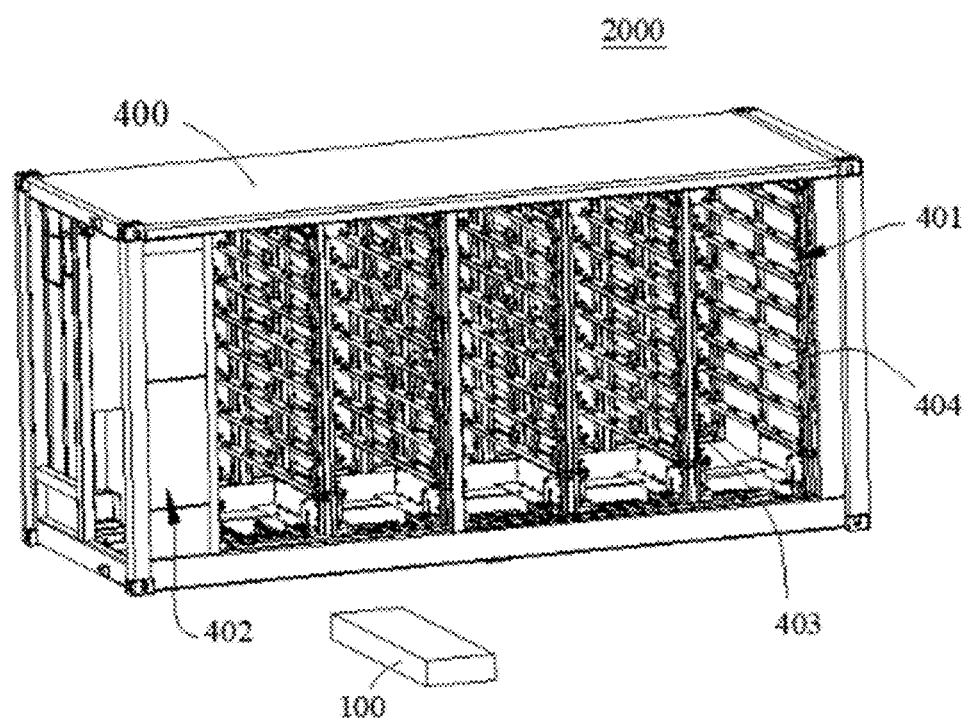
FIG. 4 is a schematic diagram of an internal structure of the energy storage apparatus shown in FIG. 3.

Referring to FIG. 3 and FIG. 4, FIG. 3 is a schematic structural diagram of an energy storage apparatus 2000 according to some embodiments of this application, and FIG. 4 is a schematic diagram of an internal structure of the energy storage apparatus 2000 shown in FIG. 3.

The energy storage apparatus 2000 includes an energy storage casing 400, a battery 100, and a control module (not shown in the figure). An internal space of the energy storage casing 400 is divided into a battery compartment 401 and an electrical compartment 402, the battery 100 being placed in the battery compartment 401, and the control module being placed in the electrical compartment 402. The battery compartment 401 is provided with columns 403 and battery brackets 404, the columns 403 typically being arranged along a height direction of the energy storage casing 400, and the battery brackets 404 being fixed to the columns 403. The battery 100 are placed on the battery brackets 404 to facilitate arrangement of a plurality of batteries 100 within the battery compartment 401. Certainly, in other embodiments, the battery cell 10 may alternatively be directly placed in the battery compartment 401 without first placing the battery cell 10 in the battery casing 20 and then placing the battery casing 20 in the battery compartment 401. This eliminates the need to provide the columns 403 and battery brackets 404 in the battery compartment 401, thereby increasing the energy density of the energy storage apparatus 2000.

Figure 5:
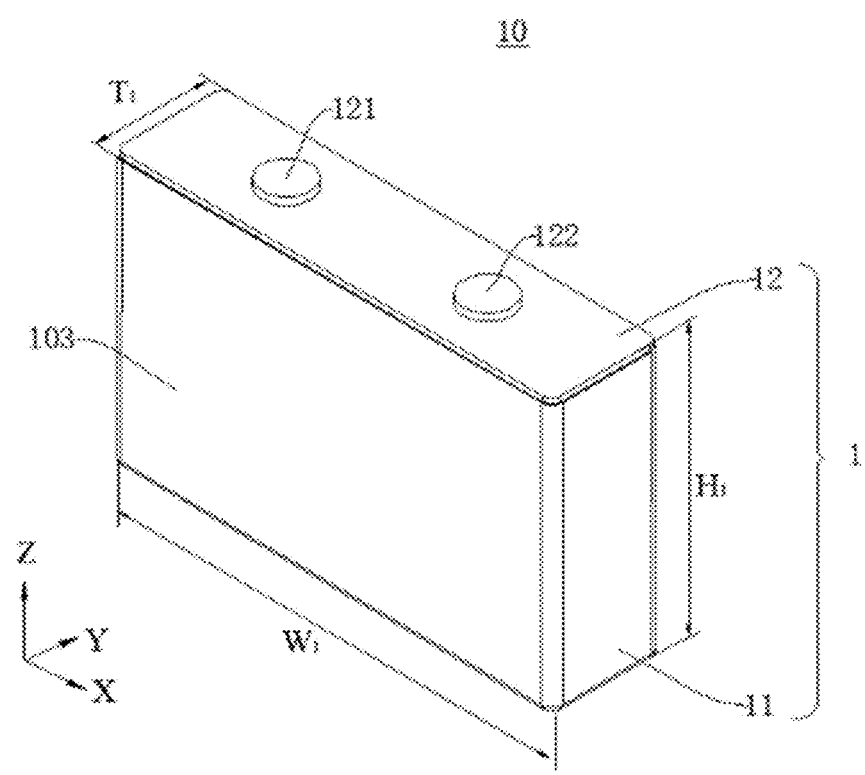
FIG. 5 is a schematic structural diagram of a battery cell according to some embodiments of this application.
Figure 6:
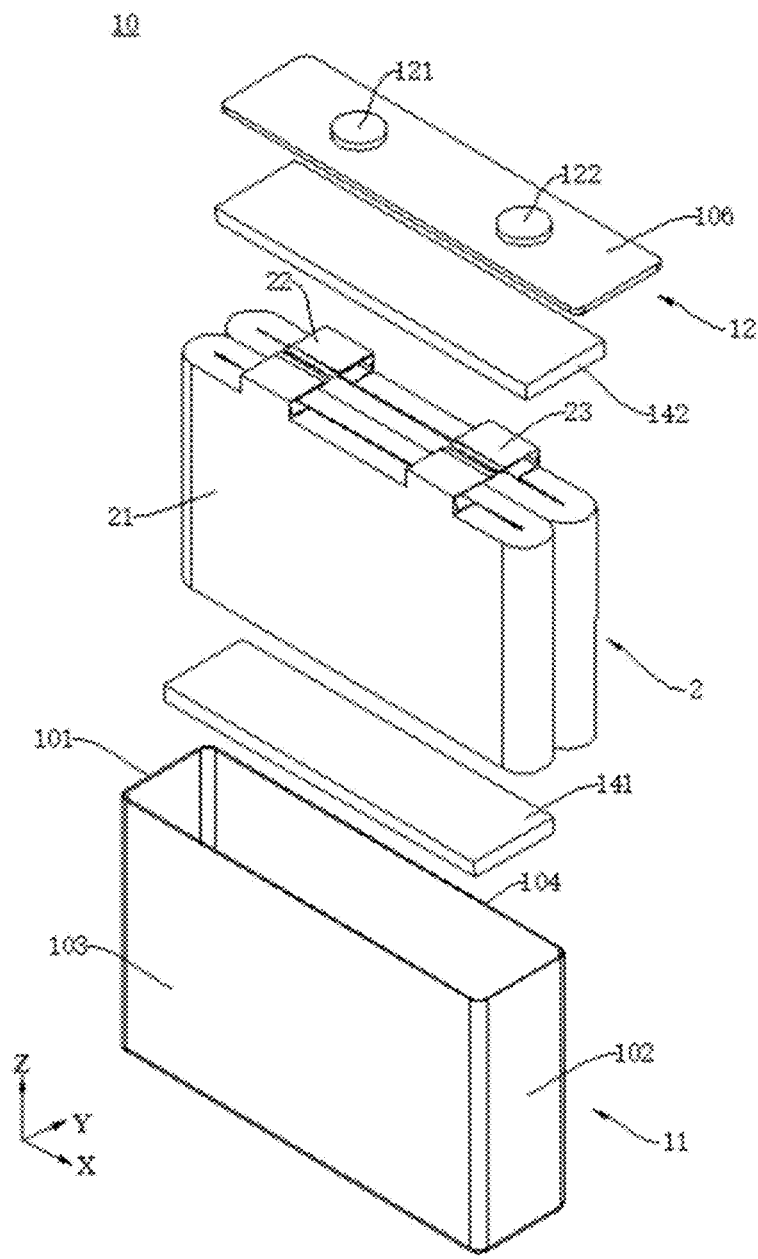
FIG. 6 is an exploded view of the battery cell shown in FIG. 5.

Referring to FIG. 5 and FIG. 6, FIG. 5 is a schematic structural diagram of a battery cell 10 according to some embodiments of this application, and FIG. 6 is an exploded view of the battery cell 10 shown in FIG. 5.

The battery cell 10 may include a housing 1 and an electrode assembly 2. One or more electrode assemblies 2 may be provided.

The electrode assembly 2 is a component in the battery cell 10 where an electrochemical reaction occurs. The electrode assembly 2 may include a positive electrode plate, a negative electrode plate, and a separator.

The housing 1 is a component for accommodating the electrode assembly 2. The housing 1 may have a right parallelepiped shape, such as a cuboid or a cube.

A size of the housing 1 in a first direction X is $W_1$, a size of the housing 1 in a second direction Y is $T_1$, and a size of the housing 1 in a third direction Z is $H_1$. The first direction X, the second direction Y, and the third direction Z are mutually perpendicular.

For ease of description in the following embodiments, the first direction X is defined as a width direction of the battery cell 10, the second direction Y is defined as a thickness direction of the battery cell 10, and the third direction Z is defined as a height direction of the battery cell 10. In this case, $W_1$ is a width of the battery cell 10, $T_1$ is a thickness of the battery cell 10, and $H_1$ is a height of the battery cell 10.

Figure 7:
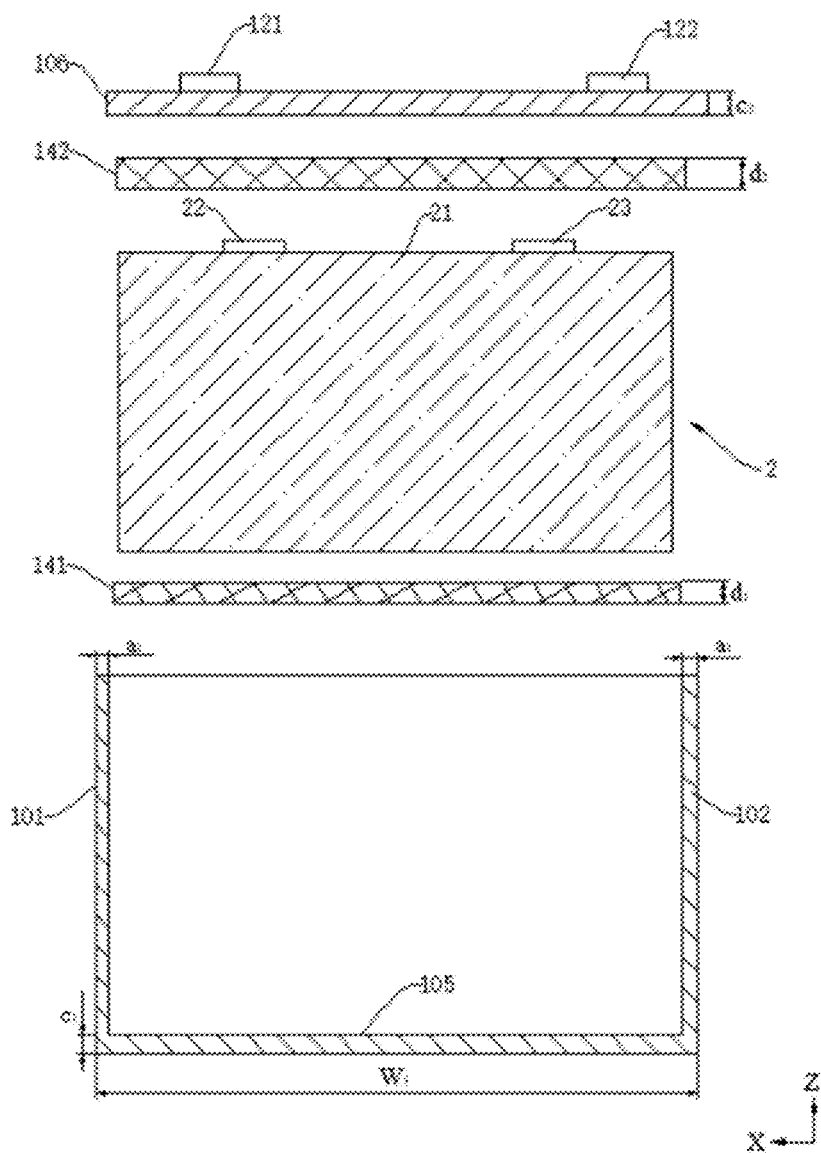
FIG. 7 is an exploded cross-sectional view of the battery cell shown in FIG. 5 taken along an XZ plane.
Figure 8:
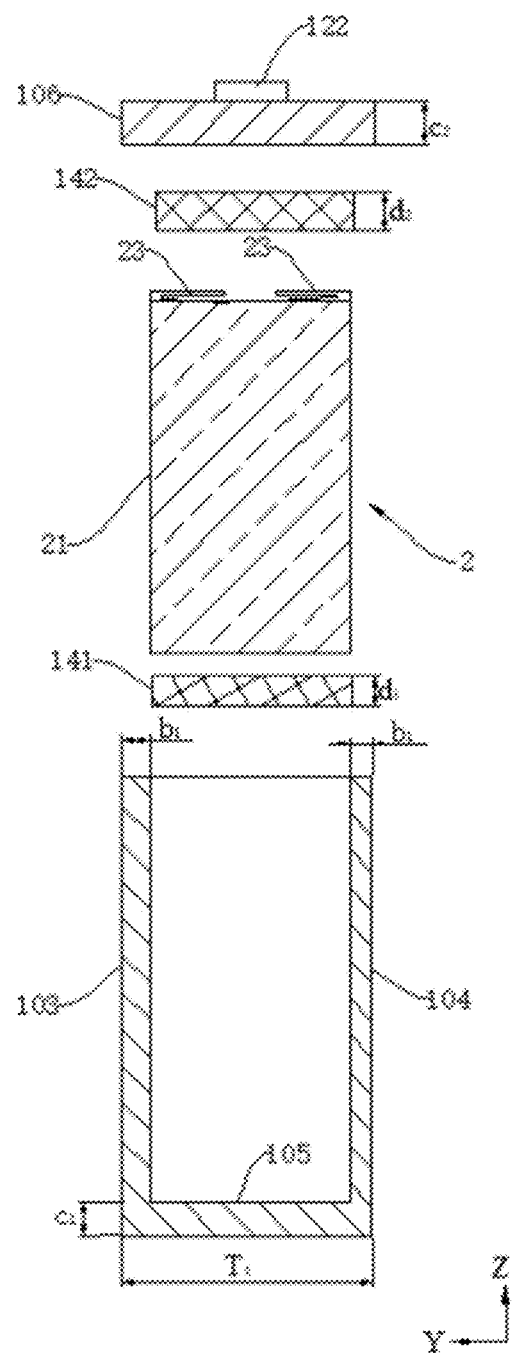
FIG. 8 is an exploded cross-sectional view of the battery cell shown in FIG. 5 taken along a YZ plane.

Referring to FIG. 5 to FIG. 8, FIG. 7 is an exploded cross-sectional view of the battery cell 10 shown in FIG. 5 taken along an XZ plane, and FIG. 8 is an exploded cross-sectional view of the battery cell 10 shown in FIG. 5 taken along a YZ plane.

The housing 1 includes a first wall 101 and a second wall 102 disposed opposite each other along the first direction X, a third wall 103 and a fourth wall 104 disposed opposite each other along the second direction Y, and a fifth wall 105 and a sixth wall 106 disposed opposite each other along the third direction Z, the six walls collectively enclosing a space for accommodating the electrode assembly 2.

A sum of thicknesses of the first wall 101 and the second wall 102 is a, a sum of thicknesses of the third wall 103 and the fourth wall 104 is b, and a sum of thicknesses of the fifth wall 105 and the sixth wall 106 is c, satisfying: $(W_1-a)*(T_1-b)*(H_1-c)/(W_1*T_1*H_1) \geq 90\%$.

In this embodiment, the thickness of the first wall 101 and the thickness of the second wall 102 may be equal or unequal; the thickness of the third wall 103 and the thickness of the fourth wall 104 may be equal or unequal; and the thickness of the fifth wall 105 and the thickness of the sixth wall 106 may be equal or unequal.

Since a, b, and c are all greater than 0, understandably, $90\% \leq (W_1-a)*(T_1-b)*(H_1-c)/(W_1*T_1*H_1) < 100\%$.

$(W_1-a)*(T_1-b)*(H_1-c)/(W_1*T_1*H_1)$ may be any value between 90% and 100%, for example, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, or 99.5%.

$(W_1-a)*(T_1-b)*(H_1-c)$ can be understood as an internal volume of the housing 1, that is, a volume of a space enclosed by inner surfaces of the housing 1; and $W_1*T_1*H_1$ is a volume of the housing 1, approximately equal to a volume of the battery cell 10.

If outer surfaces of all six walls of the housing 1 are planar, $W_1$, $T_1$, and $H_1$ are measured based on the outer surfaces of the respective walls. For example, if an outer surface of the fifth wall 105 and an outer surface of the sixth wall 106 are both planar, $H_1$ is a distance between the outer surface of the fifth wall 105 and the outer surface of the sixth wall 106 along the third direction Z.

If an outer surface of a certain wall of the housing 1 has a protrusion or a recess, $W_1$, $T_1$, and $H_1$ are measured based on a planar region of that outer surface (that is, a region excluding the protrusion or recess). For example, if an outer surface of the fifth wall 105 is planar and an outer surface of the sixth wall 106 has a first protrusion, $H_1$ is a distance along the third direction Z between a planar region of the outer surface of the sixth wall 106 excluding the first protrusion and the outer surface of the fifth wall 105. If an outer surface of the sixth wall 106 has a first protrusion and an outer surface of the fifth wall 105 has a second protrusion, $H_1$ is a distance along a height direction of the battery cell 10 between a planar region of the outer surface of the fifth wall 105 excluding the second protrusion and a planar region of the outer surface of the sixth wall 106 excluding the first protrusion.

If all six walls of the housing 1 are walls of uniform thickness, a distance between an outer surface and an inner surface of a wall may be measured at any position of that wall to obtain the thickness of that wall.

If a certain wall of the housing 1 is a wall of non-uniform thickness, a distance between an outer surface and an inner surface of that wall is measured at a position of a maximum thickness of that wall to obtain the thickness of that wall. That is, if a thickness of a certain wall is non-uniform, a maximum thickness of that wall is used to calculate a, b, or c.

In the embodiments of this application, the ratio of the internal volume of the housing 1 of the battery cell 10 to the volume of the housing 1 is set greater than 90%, increasing the internal space of the housing 1, thereby accommodating a larger electrode assembly 2. Under the same chemical material system, the volumetric energy density of the battery cell 10 can be increased.

The following provides a detailed description through specific experimental data:

In the experiment, the battery cell 21 was selected as a prismatic battery cell, the housing body 11 being a hollow structure with an opening at one end, and one end cap 12 being provided.

TABLE 1

| No. | $W_1$ (mm) | $T_1$ (mm) | $H_1$ (mm) | a (mm) | b (mm) | c (mm) | Chemical system of battery cell | $(W_1-a)*(T_1-b)*(K_1-c)/(W_1*T_1*K_1)$ | Volumetric energy density of battery cell (Ah/L) |
|---|---|---|---|---|---|---|---|---|---|
| Example 1 | 800 | 100 | 51.9 | 1.2 | 1.6 | 4 | Lithium-containing phosphate | 0.91 | 118 |
| Example 2 | 690 | 100 | 60.2 | 1.2 | 1.6 | 4 | Lithium-containing phosphate | 0.92 | 119.3 |
| Example 3 | 580 | 100 | 71.6 | 1.2 | 1.6 | 4 | Lithium-containing phosphate | 0.93 | 120.6 |
| Example 4 | 470 | 100 | 88.4 | 1.2 | 1.6 | 4 | Lithium-containing phosphate | 0.94 | 121.9 |
| Example 5 | 690 | 100 | 48.9 | 1.6 | 2 | 4 | Lithium transition metal oxide | 0.90 | 190.1 |
| Example 6 | 610 | 100 | 55.4 | 1.6 | 2 | 4 | Lithium transition metal oxide | 0.91 | 192.2 |
| Example 7 | 520 | 100 | 65 | 1.6 | 2 | 4 | Lithium transition metal oxide | 0.92 | 194.3 |
| Example 8 | 430 | 100 | 78.5 | 1.6 | 2 | 4 | Lithium transition metal oxide | 0.93 | 196.4 |
| Example 9 | 760 | 90 | 49.4 | 1.6 | 2 | 4 | Sodium-ion battery cell | 0.90 | 87 |
| Example 10 | 660 | 90 | 56.8 | 1.6 | 2 | 4 | Sodium-ion battery cell | 0.91 | 88 |
| Example 11 | 560 | 90 | 67 | 1.6 | 2 | 4 | Sodium-ion battery cell | 0.92 | 88.9 |

TABLE 1-continued

| No. | $W_1$ (mm) | $T_1$ (mm) | $H_1$ (mm) | a (mm) | b (mm) | c (mm) | Chemical system of battery cell | $(W_1-a)*(T_1-b)*(K_1-c)/(W_1*T_1*K_1)$ | Volumetric energy density of battery cell (Ah/L) |
|---|---|---|---|---|---|---|---|---|---|
| Example 12 | 460 | 90 | 81.5 | 1.6 | 2 | 4 | Sodium-ion battery cell | 0.93 | 89.9 |
| Comparative Example 1 | 1120 | 100 | 37.1 | 1.2 | 1.6 | 4 | Lithium-containing phosphate | 0.88 | 115.3 |
| Comparative Example 2 | 870 | 100 | 38.5 | 1.6 | 2 | 4 | Lithium transition metal oxide | 0.88 | 185.8 |
| Comparative Example 3 | 960 | 90 | 39.1 | 1.6 | 2 | 4 | Sodium-ion battery cell | 0.88 | 85.1 |

According to Table 1 above, it can be learned from comparison of Examples 1-4 with Comparative Example 1 that when the positive electrode material of the battery cell 10 includes the lithium-containing phosphate, $(W_1-a)*(T_1-b)*(H_1-c)/(W_1*T_1*H_1) \geq 0.9$ can effectively increase the volumetric energy density of the battery cell 10. It can be learned from comparison of Examples 5-8 with Comparative Example 2 that when the positive electrode material of the battery cell 10 includes the lithium transition metal oxide, $(W_1-a)*(T_1-b)*(H_1-c)/(W_1*T_1*H_1) \geq 0.9$ can effectively increase the volumetric energy density of the battery cell 10. It can be learned from comparison of Examples 9-12 with Comparative Example 3 that when the battery cell 10 is a sodium-ion battery cell, $(W_1-a)*(T_1-b)*(H_1-c)/(W_1*T_1*H_1) \geq 0.9$ can effectively increase the volumetric energy density of the battery cell 10.

To ensure that the ratio of the internal volume of the housing 1 to the volume of the housing 1 can be greater than 90%, and to ensure a uniform proportion of wall thicknesses of the housing 1 in three directions to improve balance of forces exerted on the housing 1 in the three directions, in some embodiments, $W_1$ and a satisfy $(W_1-a)/W_1 \geq 97.0\%$.

Setting the ratio of $W_1-a$ to $W_1$ to be greater than 97.0% increases the width of the internal space of the housing 1 while keeping the width of the battery cell 10 unchanged, thereby accommodating a wider electrode assembly 2. Under the same chemical material system, the volumetric energy density of the battery cell 10 can be increased. $(W_1-a)/W_1$ may be any value between 97.0% and 100%, for example, 97.0%, 97.5%, 98%, 98.5%, 99%, or 99.5%.

In some embodiments, $T_1$ and b satisfy $(T_1-b)/T_1 \geq 96.5\%$.

Setting the ratio of $T_1-b$ to $T_1$ to be greater than 96.5% increases the width of the internal space of the housing 1 while keeping the thickness of the battery cell 10 unchanged, thereby accommodating a thicker electrode assembly 2. Under the same chemical material system, the volumetric energy density of the battery cell 10 can be increased. $(T_1-b)/T_1$ may be any value between 96.5% and 100%, for example, 96.5%, 97%, 97.5%, 98%, 98.5%, 99%, or 99.5%.

In some embodiments, $H_1$ and c satisfy $(H_1-c)/H_1 \geq 96.5\%$.

Setting the ratio of $H_1-c$ to $H_1$ to be greater than 96.5% increases the height of the internal space of the housing 1 while keeping the height of the battery cell 10 unchanged, thereby accommodating a taller electrode assembly 2. Under the same chemical material system, the volumetric energy density of the battery cell 10 can be increased. $(H_1-c)/H_1$ may be any value between 96.5% and 100%, for example, 96.5%, 97%, 97.5%, 98%, 98.5%, 99%, or 99.5%.

In some embodiments, $W_1$ and a satisfy $(W_1-a)/W_1 \geq 97.0\%$, $T_1$ and b satisfy $(T_1-b)/T_1 \geq 96.5\%$, and $H_1$ and c satisfy $(H_1-c)/H_1 \geq 96.5\%$.

As an example, the housing 1 may include a housing body 11 and an end cap 12.

The housing body 11 may be a hollow structure with an opening formed at one end and closed at another end, or the housing body 11 may be a hollow structure with openings formed at two opposite ends. The opening is configured to allow the electrode assembly 2 to enter the internal space of the housing body 11. The end cap 12 is a component that closes the opening of the housing body 11 to isolate the internal environment of the battery cell 10 from an external environment. The end cap 12 and the housing body 11 together define a sealed space for accommodating the electrode assembly 2, electrolyte, and other components. The end cap 12 may be connected to the housing body 11 through welding or crimping to close the opening of the housing body 11. A shape of the end cap 12 may be adapted to a shape of the housing body 11. For example, if the housing body 11 is a cuboid structure, the end cap 12 is a rectangular plate-like structure adapted to the housing body 11.

In the battery cell 10, one or more end caps 12 may be provided.

As shown in FIG. 6, in an embodiment where the housing body 11 is a hollow structure with an opening formed at one end, one end cap 12 may be correspondingly provided, the end cap 12 closing the opening at one end of the housing body 11. The one end cap 12 and the housing body 11 together define a sealed space. In this embodiment, the housing body 11 includes the first wall 101, the second wall 102, the third wall 103, the fourth wall 104, and the fifth wall 105 that are formed integrally, where the first wall 101, the second wall 102, the third wall 103, and the fourth wall 104 serve as side walls of the housing body 11, and the fifth wall 105 serves as a bottom wall of the housing body 11. The sixth wall 106 is formed separately from the other five walls, and the sixth wall 106 serves as the end cap 12.

Figure 10:
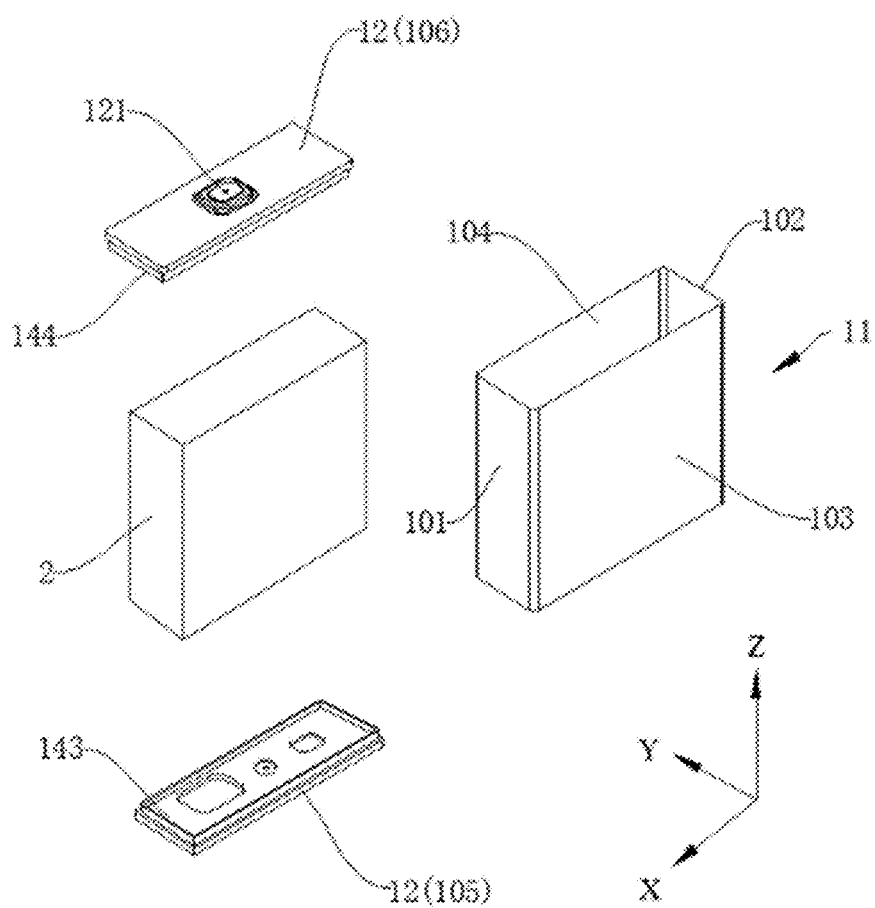
FIG. 10 is an exploded view of the battery cell shown in FIG. 9.

As shown in FIG. 10, in an embodiment where the housing body 11 is a hollow structure with openings formed at two ends, two end caps 12 may be correspondingly provided, the two end caps 12 respectively closing the two openings of the housing body 11. The two end caps 12 and the housing body 11 together define a sealed space. In this embodiment, the housing body 11 includes the first wall 101, the second wall 102, the third wall 103, and the fourth wall 104 that are formed integrally, the fifth wall 105 is formed separately from the other five walls, and the sixth wall 106 is also formed separately from the other five walls. The fifth wall 105 serves as one end cap 12, and the sixth wall 106 serves as the other end cap 12.

To reduce a likelihood of interference between the electrode assembly 2 and the housing body 11 during insertion of the electrode assembly 2 into the housing body 11 so as to lower the risk of damage to the electrode assembly 2, a certain assembly clearance (that is, an insertion clearance) is reserved for the electrode assembly 2 in designing the housing body 11, where the assembly clearance may be 0.8 mm to 2 mm.

Additionally, to reduce a likelihood of an internal short circuit in the battery cell 10, an insulating member may be disposed inside the housing 1, but these insulating members inevitably occupy a portion of the internal space of the housing 1, thereby reducing a space available for the electrode assembly 2.

Referring to FIG. 7 and FIG. 8, in some embodiments of this application, the housing 1 includes a housing body 11 and an end cap 12, the housing body 11 having an opening, and the end cap 12 covering the opening. The housing body 11 includes the first wall 101, the second wall 102, the third wall 103, the fourth wall 104, and the fifth wall 105 that are formed integrally, and the end cap 12 is the sixth wall 106. The battery cell 10 further includes a first insulating member 141 and a second insulating member 142, the first insulating member 141 being disposed between the fifth wall 105 and the electrode assembly 2 and abutting against the fifth wall 105; and the second insulating member 142 being disposed between the sixth wall 106 and the electrode assembly 2 and abutting against the sixth wall 106. A maximum size of the first insulating member 141 in the third direction Z is $d_1$, and a maximum size of the second insulating member 142 in the third direction Z is $d_2$, satisfying: $(W_1-a-1.6 \text{ mm})*(T_1-b-1.6 \text{ mm})*(H_1-c-d_1-d_2)/(W_1*T_1*H_1) \geq 88\%$, 0.3 mm$\leq d_1 \leq$1.2 mm, and 2 mm$\leq d_2 \leq$10 mm.

In this embodiment, $W_1-a-1.6$ mm denotes a maximum size of the internal space of the housing 1 available for the electrode assembly 2 along the first direction X when a sum of an assembly clearance between the electrode assembly 2 and the first wall 101 and an assembly clearance between the electrode assembly 2 and the second wall 102 is 1.6 mm. $T_1-b-1.6$ mm denotes a maximum size of the internal space of the housing 1 available for the electrode assembly 2 along the second direction Y when a sum of an assembly clearance between the electrode assembly 2 and the third wall 103 and an assembly clearance between the electrode assembly 2 and the fourth wall 104 is 1.6 mm. $H_1-c-d_1-d_2$ denotes a maximum size of the internal space of the housing 1 available for the electrode assembly 2 along the third direction Z when the first insulating member 141 abutting against the fifth wall 105 is disposed between the fifth wall 105 and the electrode assembly 2, and the second insulating member 142 abutting against the sixth wall 106 is disposed between the sixth wall 106 and the electrode assembly. The first insulating member 141 may be a bottom support plate, and the second insulating member 142 may be a lower plastic piece.

Setting the ratio of $(W_1-a-1.6 \text{ mm})*(T_1-b-1.6 \text{ mm})*(H_1-c-d_1-d_2)$ to $W_1*T_1*H_1$ to be greater than 88% increases the space within the housing 1 available for the electrode assembly 2, allowing for placement of a larger electrode assembly 2, thereby further enhancing the volumetric energy density of the battery cell 10.

In some embodiments of this application, $(W_1-a-4 \text{ mm})*(T_1-b-4 \text{ mm})*(H_1-c-d_1-d_2)/(W_1*T_1*H_1) \geq 85\%$, 0.3 mm$\leq d_1 \leq$10 mm, and 2 mm$\leq d_2 \leq$10 mm are satisfied.

In this embodiment, $W_1-a-4$ mm denotes a maximum size of the internal space of the housing 1 available for the electrode assembly 2 along the first direction X when a sum of an assembly clearance between the electrode assembly 2 and the first wall 101 and an assembly clearance between the electrode assembly 2 and the second wall 102 is 4 mm. $T_1-b-4$ mm denotes a maximum size of the internal space of the housing 1 available for the electrode assembly 2 along the second direction Y when a sum of an assembly clearance between the electrode assembly 2 and the third wall 103 and an assembly clearance between the electrode assembly 2 and the fourth wall 104 is 4 mm. $H_1-c-d_1-d_2$ denotes a maximum size of the internal space of the housing 1 available for the electrode assembly 2 along the third direction Z when the first insulating member 141 abutting against the fifth wall 105 is disposed between the fifth wall 105 and the electrode assembly 2, and the second insulating member 142 abutting against the sixth wall 106 is disposed between the sixth wall 106 and the electrode assembly 2.

Setting the ratio of $(W_1-a-4 \text{ mm})*(T_1-b-4 \text{ mm})*(H_1-c-d_1-d_2)$ to $W_1*T_1*H_1$ to be greater than 85% increases the space within the housing 1 available for the electrode assembly 2, allowing for placement of a larger electrode assembly 2, thereby further enhancing the volumetric energy density of the battery cell 10.

Figure 9:
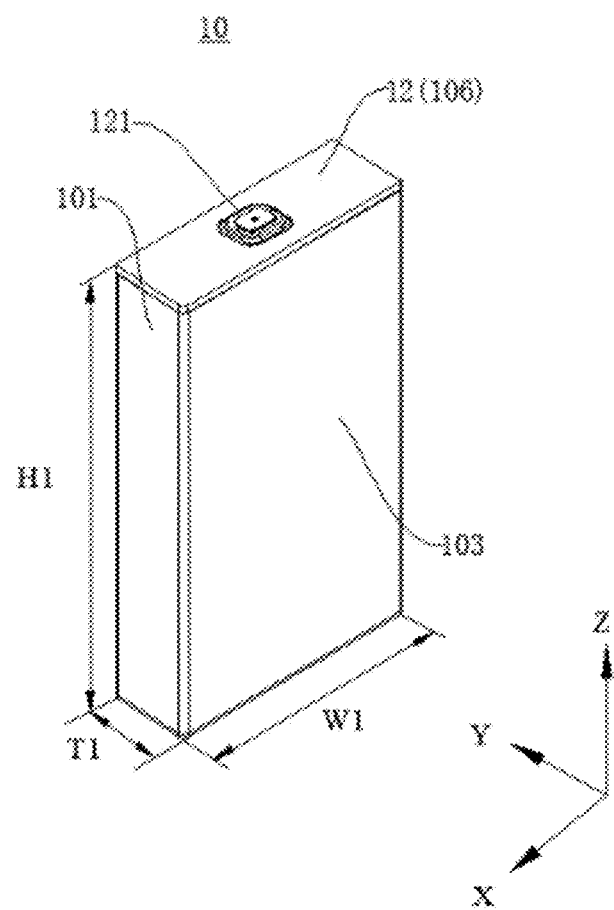
FIG. 9 is a schematic structural diagram of a battery cell according to some other embodiments of this application.
Figure 11:
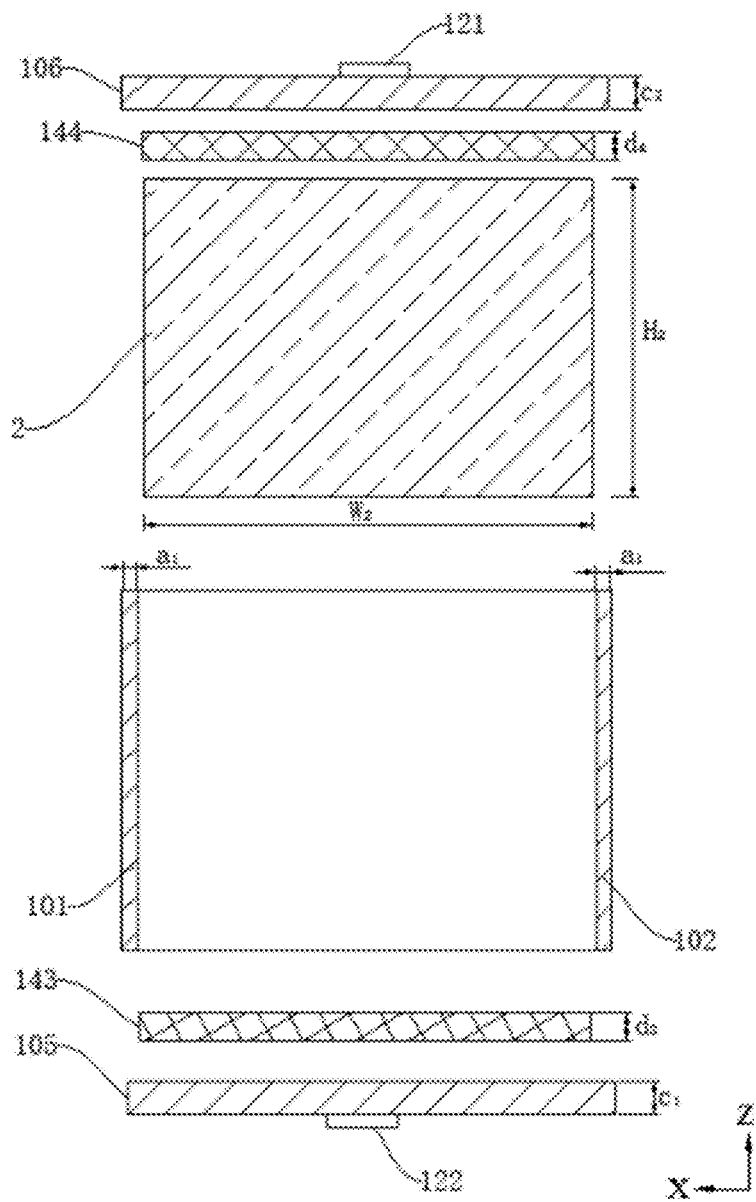
FIG. 11 is an exploded cross-sectional view of the battery cell shown in FIG. 10 taken along an XZ plane.
Figure 12:
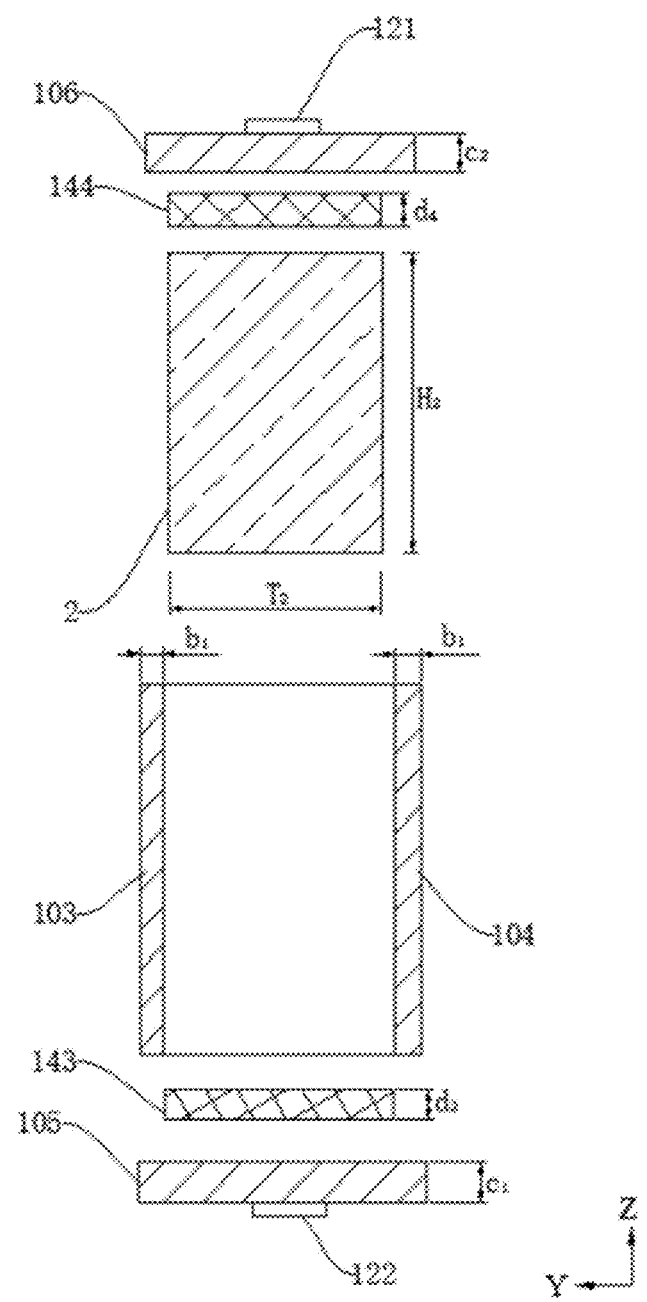
FIG. 12 is an exploded cross-sectional view of the battery cell shown in FIG. 10 taken along a YZ plane.

Referring to FIG. 9 to FIG. 12, FIG. 9 is a schematic structural diagram of a battery cell according to some other embodiments of this application, FIG. 10 is an exploded view of the battery cell shown in FIG. 9, FIG. 11 is a cross-sectional view of the battery cell shown in FIG. 9 taken along an XZ plane, and FIG. 12 is a cross-sectional view of the battery cell shown in FIG. 9 taken along a YZ plane.

In some embodiments of this application, the housing 1 includes a housing body 11 and two end caps 12, the housing body 11 having two openings disposed opposite each other along the third direction Z, and the two end caps 12 respectively covering the openings on corresponding sides. The housing body 11 includes the first wall 101, the second wall 102, the third wall 103, and the fourth wall 104 that are formed integrally, and the two end caps 12 are the fifth wall and the sixth wall, respectively. The battery cell 10 further includes a third insulating member 143 and a fourth insulating member 144, the third insulating member 143 being disposed between the fifth wall 105 and the electrode assembly 2 and abutting against the fifth wall 105, and the fourth insulating member 144 being disposed between the sixth wall 106 and the electrode assembly 2 and abutting against the sixth wall 106. A maximum size of the third insulating member 143 in the third direction Z is $d_3$, and a maximum size of the fourth insulating member 144 in the third direction Z is $d_4$, satisfying: $(W_1-a-1.6 \text{ mm})*(T_1-b-1.6 \text{ mm})*(H_1-c-d_3-d_4)/(W_1*T_1*H_1) \geq 88\%$, 2 mm$\leq d_3 \leq$10 mm, and 2 mm$\leq d_4 \leq$10 mm.

In this embodiment, the third insulating member and the fourth insulating member may be lower plastic pieces.

Setting the ratio of $(W_1-a-1.6 \text{ mm})*(T_1-b-1.6 \text{ mm})*(H_1-c-d_3-d_4)$ to $W_1*T_1*H_1$ be greater than 88% increases the space within the housing 1 available for the electrode assembly 2, allowing for placement of a larger electrode assembly 2, thereby further enhancing the volumetric energy density of the battery cell 10.

In some embodiments of this application, $(W_1-a-4 \text{ mm})*(T_1-b-4 \text{ mm})*(H_1-c-d_3-d_4)/(W_1*T_1*H_1) \geq 85\%$, 2 mm$\leq d_3 \leq$10 mm, and 2 mm$\leq d_4 \leq$10 mm are satisfied.

Setting the ratio of $(W_1-a-4 \text{ mm})*(T_1-b-4 \text{ mm})*(H_1-c-d_3-d_4)$ to $W_1*T_1*H_1$ increases the space within the housing 1 available for the electrode assembly 2, allowing for placement of a larger electrode assembly 2, thereby further enhancing the volumetric energy density of the battery cell 10.

In some embodiments of this application, $W_1$, $T_1$, and $H_1$ satisfy 3000 cm³≤$W_1*T_1*H_1$≤40000 cm³, that is, the volume of the housing 1 is between 3000 cm³ and 40000 cm³.

When $W_1*T_1*H_1$<3000 cm³, to make the ratio of the internal volume of the housing 1 to the volume of the housing 1 greater than 90%, a small wall thickness needs to be designed for the housing 1. This results in a small supportable load, insufficient structural strength and rigidity of the housing 1, and susceptibility to deformation or damage, which is detrimental to safety of the battery cell 10.

When $W_1*T_1*H_1$>40000 cm³, the volume and capacity of the battery cell 10 are large, and a current during discharge of the battery cell 10 is high, causing a great heat generation in overcurrent components in a circuit, and easily leading to damage of the overcurrent components.

In this embodiment, setting the volume of the housing 1 between 3000 cm³ and 40000 cm³ ensures that first, when the ratio of the internal volume of the housing 1 to the volume thereof is greater than 90%, the wall thickness of the housing 1 is not excessively small, thereby meeting requirements for structural strength and rigidity of the housing 1; and second, can control the capacity and current of the battery cell 10 within appropriate ranges, reducing a risk of damage to overcurrent components in a circuit.

$W_1*T_1*H_1$ may be any value between 3000 cm³ and 40000 cm³, for example, 3000 cm³, 3100 cm³, 3200 cm³, 3300 cm³, 3400 cm³, 3500 cm³, 3600 cm³, 3700 cm³, 3800 cm³, 3900 cm³, 4000 cm³, 4050 cm³, 4100 cm³, 4200 cm³, 4500 cm³, 5000 cm³, 10000 cm³, 15000 cm³, 20000 cm³, 25000 cm³, 30000 cm³, 35000 cm³, or 40000 cm³.

In some embodiments, 3200 cm³≤$W_1*T_1*H_1$≤32000 cm³.

For example, $W_1*T_1*H_1$ may be any value between 3200 cm³ and 32000 cm³, for example, 3250 cm³, 3350 cm³, 3450 cm³, 3550 cm³, 3650 cm³, 3750 cm³, 3850 cm³, 3950 cm³, 4650 cm³, 6650 cm³, 9500 cm³, 12000 cm³, 18000 cm³, or 31000 cm³.

In some embodiments, 3720 cm³≤$W_1*T_1*H_1$≤12500 cm³.

In some embodiments, 4000 cm³≤$W_1*T_1*H_1$≤6000 cm³.

Figure 13:
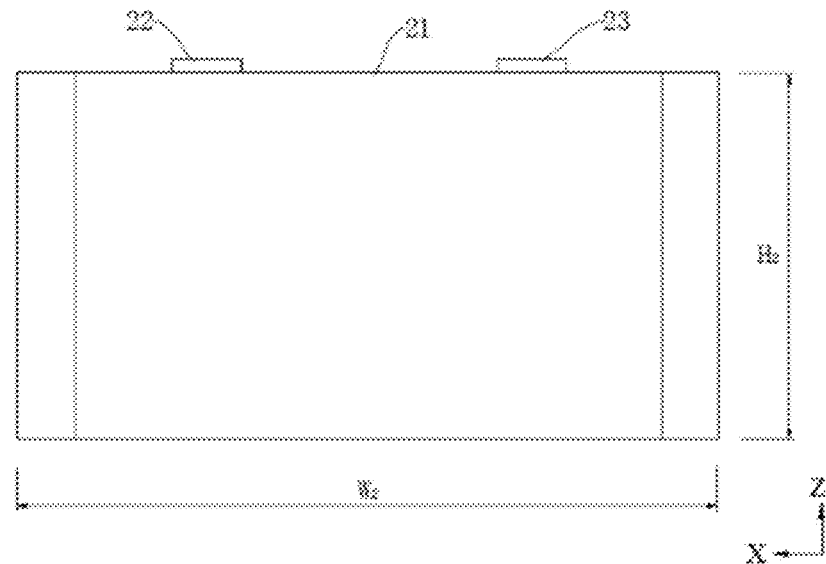
FIG. 13 is a front view of an electrode assembly shown in FIG. 6.
Figure 14:
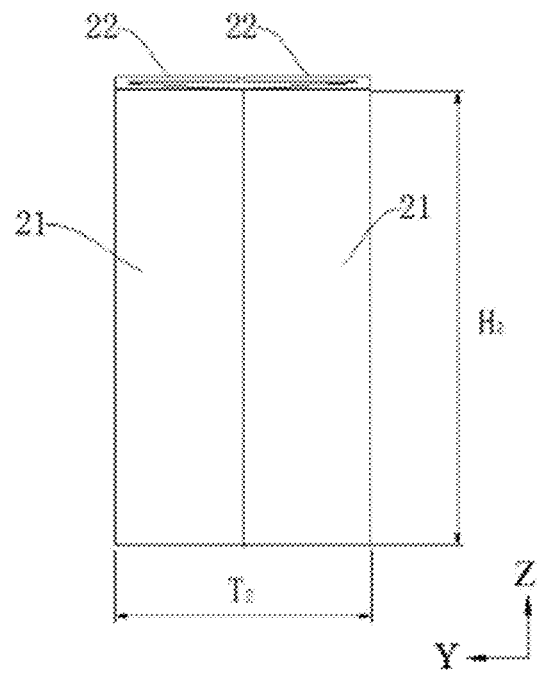
FIG. 14 is a side view of an electrode assembly shown in FIG. 6.
Figure 15:
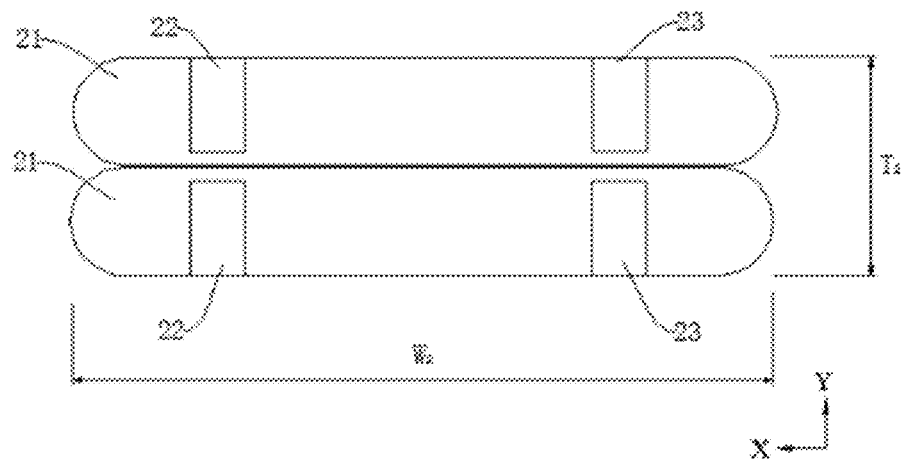
FIG. 15 is a top view of an electrode assembly shown in FIG. 6.
Figure 16:
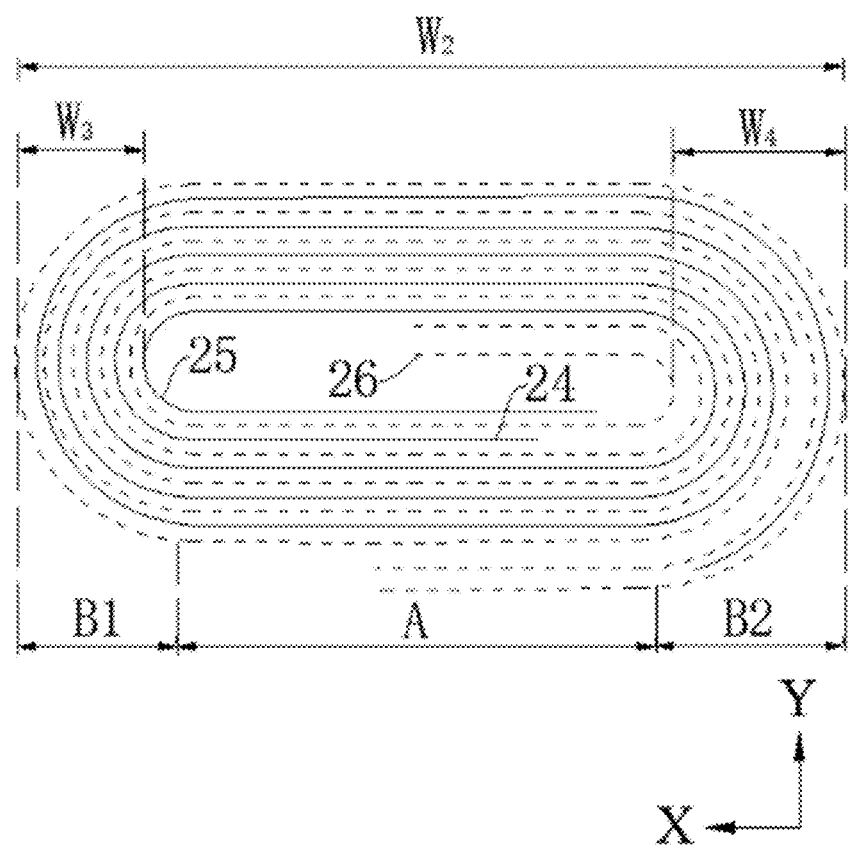
FIG. 16 is a cross-sectional view of an electrode assembly shown in FIG. 6.

Referring to FIG. 6 and FIG. 13 to FIG. 16. FIG. 13 is a front view of two electrode assemblies 2 in FIG. 6, FIG. 14 is a side view of the two electrode assemblies 2 in FIG. 6, FIG. 15 is a top view of the two electrode assemblies 2 in FIG. 6, and FIG. 16 is a cross-sectional view of one electrode assembly 2 in FIG. 6.

In some embodiments of this application, the electrode assembly 2 includes a body 21, a positive electrode tab 22, and a negative electrode tab 23. The positive electrode tab 22 and the negative electrode tab 23 extend from the body 21. The body 21 is a flat structure, a maximum size of the body 21 in the first direction X being $W_2$, a maximum size of the body 21 in the second direction Y being $T_2$, and a maximum size of the body 21 in the third direction Z being $H_2$, satisfying: $(W_2*T_2*H_2)/(W_1*T_1*H_1) \geq 80\%$.

The electrode assembly 2 includes a positive electrode plate, a negative electrode plate, and a separator. The positive electrode plate includes a positive electrode current collector and a positive electrode active material layer, the positive electrode active material layer being applied on a partial region of the positive electrode current collector. The positive electrode active material layer and a region of the positive electrode current collector coated with the positive electrode active material layer form a positive electrode coated region, and a region of the positive electrode current collector not coated with the positive electrode active material layer forms the positive electrode tab 22, the positive electrode tab 22 protruding from the positive electrode coated region. The negative electrode plate includes a negative electrode current collector and a negative electrode active material layer, the negative electrode active material layer being applied on a partial region of the negative electrode current collector. The negative electrode active material layer and a region of the negative electrode current collector coated with the negative electrode active material layer form a negative electrode coated region, and a region of the negative electrode current collector not coated with the negative electrode active material layer forms the negative electrode tab 23, the negative electrode tab 23 protruding from the negative electrode coated region.

The positive electrode coated region and the negative electrode coated region are disposed opposite each other, the positive electrode coated region, the negative electrode coated region, and the separator forming the body 21 of the electrode assembly 2.

The electrode assembly 2 may be a wound structure formed by winding the positive electrode plate, the separator, and the negative electrode plate, or a laminated structure formed by laminating the positive electrode plate, the separator, and the negative electrode plate. Understandably, whether the electrode assembly 2 is a wound structure or a laminated structure, the body 21 may be a flat structure.

It should be noted that when a plurality of electrode assemblies 2 are provided in the battery cell 10, $W_2$ is a maximum size in the first direction X of a unified whole composed of the bodies 21 of the plurality of electrode assemblies 2, $T_2$ is a maximum size in the second direction Y of the unified whole composed of the bodies 21 of the plurality of electrode assemblies 2, and $H_2$ is a maximum size in the third direction Z of the unified whole composed of the bodies 21 of the plurality of electrode assemblies 2. As an example, as shown in FIG. 6 and FIG. 15, two electrode assemblies 2 are disposed within the housing 1, the two electrode assemblies 2 being stacked along the second direction Y, in which case $T_2$ is a maximum size in the second direction Y of a unified whole composed of the bodies 21 of the two electrode assemblies 2.

In this embodiment, setting the ratio of $(W_2*T_2*H_2)$ to $(W_1*T_1*H_1)$ to be greater than 80% allows the electrode assembly 2 to fully utilize the internal space of the housing 1, avoiding a situation where the housing 1 has a large internal volume but the electrode assembly 2 has a small volume, thereby increasing the volumetric energy density of the battery cell 10 and reducing movement of the electrode assembly 2 within the housing 1.

$(W_2*T_2*H_2)/(W_1*T_1*H_1)$ may be any value between 80% and 100%, for example, 80%, 81%, 82%, 83%, 84%, 85%, 86%, 87%, 88%, 89%, 90%, 92%, 94%, or 96%.

To ensure that the ratio of $W_2*T_2*H_2$ to $W_1*T_1*H_1$ can be greater than 80%, and to match sizes of the body 21 of the electrode assembly 2 in various directions with sizes of the internal space of the housing 1 in various directions so as to further reduce movement of the electrode assembly 2 within the housing 1, in some embodiments, $W_2/(W_1-a) \geq 91.5\%$, $T_2/(T_1-b) \geq 93.2\%$, and $H_2/(H_1-c) \geq 94.0\%$ are satisfied.

Setting the ratio of $W_2$ to $W_1-a$ to be greater than 91.5% can increase the space utilization rate of the internal space of the housing 1 in the first direction X. Under the same chemical material system, the volumetric energy density of the battery cell 10 can be increased. The ratio of $W_2$ to $W_1-a$ may be any value greater than 91.5%, for example, 91.6%, 91.8%, 92.0%, 92.5%, 93.0%, 93.5%, 94.0%, 94.5%, or 95.0%.

Setting the ratio of $T_2$ to $T_2-b$ to be greater than 93.2% can increase the space utilization rate of the internal space of the housing 1 in the second direction Y. Under the same chemical material system, the volumetric energy density of the battery cell 10 can be increased. The ratio of $T_2$ to $T_2-b$ may be any value greater than 93.2%, for example, 93.5%, 94.0%, 94.5%, 95.0%, 95.5%, 96.0%, 96.5%, 97.0%, or 97.5%.

Setting the ratio of $H_2$ to $H_1-c$ to be greater than 94.0% can increases the space utilization rate of the internal space of the housing 1 in the third direction Z. Under the same chemical material system, the volumetric energy density of the battery cell 10 can be increased. The ratio of $H_2$ to $H_1-c$ may be any value greater than 94.0%, for example, 94.5%, 95.0%, 95.5%, 96.0%, 96.5%, 97.0%, 97.5%, 98.0%, or 98.5%.

In the embodiments shown in FIG. 6 and FIG. 13 to FIG. 16, the electrode assembly 2 is a wound structure, a winding center line of the electrode assembly 2 being disposed along the third direction Z, the positive electrode tab 22 and the negative electrode tab 23 being located at a same end of the body 21 and both facing toward the end cap 12. However, the embodiments of this application are not limited thereto.

Figure 17:
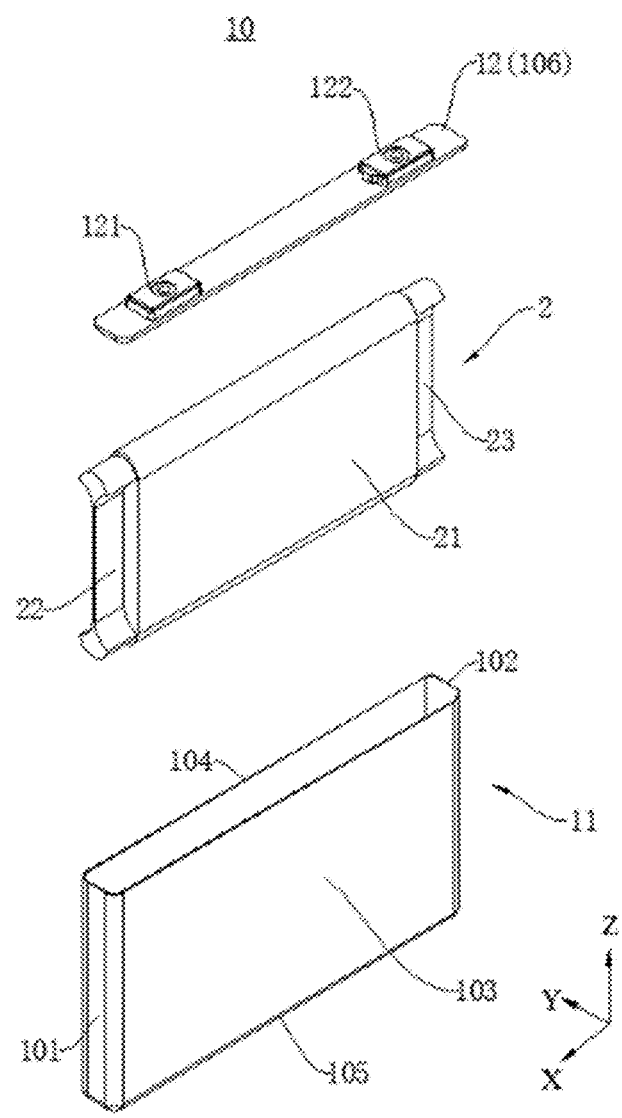
FIG. 17 is an exploded view of a battery cell according to yet some other embodiments of this application.
Figure 18:
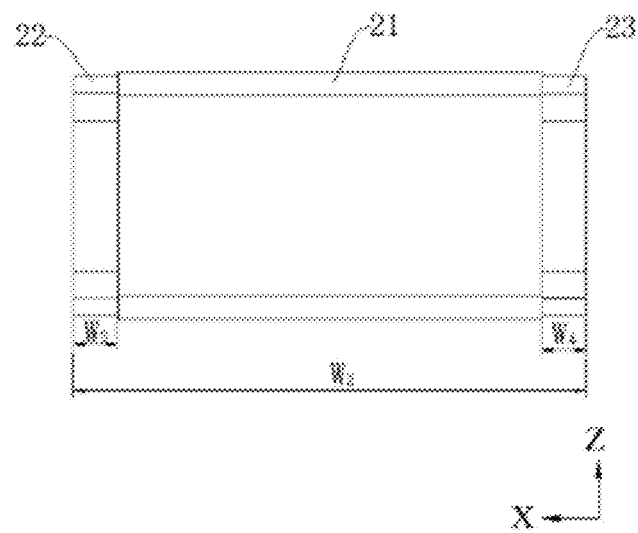
FIG. 18 is a front view of an electrode assembly shown in FIG. 17.
Figure 19:
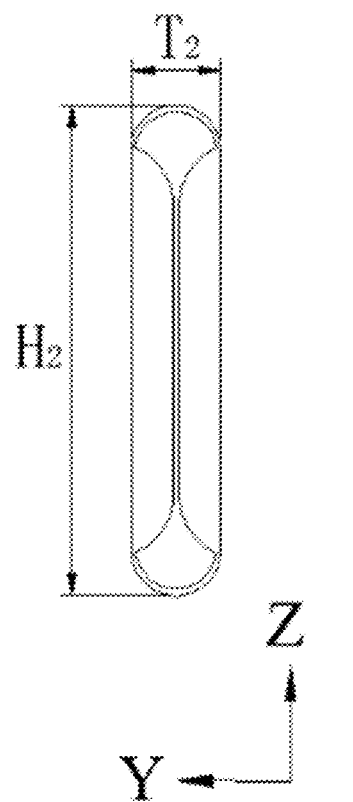
FIG. 19 is a side view of an electrode assembly shown in FIG. 17.

Referring to FIG. 17 to FIG. 19, FIG. 17 is an exploded view of a battery cell according to yet some other embodiments of this application, FIG. 18 is a front view of the electrode assembly in FIG. 17, and FIG. 19 is a top view of the electrode assembly in FIG. 17.

In yet some other embodiments of this application, the electrode assembly 2 is a wound structure, a winding center line of the electrode assembly 2 being disposed along the first direction X, the positive electrode tab 22 and the negative electrode tab 23 being located at opposite ends of the body 21, the positive electrode tab 22 facing toward the first wall 101, and the negative electrode tab 23 facing toward the second wall 102.

Referring to FIG. 16, when the electrode assembly 2 is a wound structure, the body 21 may include a flat region A, a first bent region B1, and a second bent region B2, the first bent region B1 and the second bent region B2 being located at two ends of the flat region A, respectively. In the flat region A, the positive electrode plate 24, the negative electrode plate 25, and the separator 26 are substantially planar in shape. In the first bent region B1 and the second bent region B2, the positive electrode plate 24, the negative electrode plate 25, and the separator 26 all have a bent or curved surface shape.

In some embodiments of this application, along the first direction X, the first bent region B1 and the second bent region B2 are located at two ends of the flat region A, respectively, that is, the first bent region B1, the flat region A, and the second bent region B2 are arranged along the first direction X, a direction of the winding center line of the electrode assembly 2 being the third direction Z. In this embodiment, the first bent region B1 includes a plurality of first bent portions arranged in layers, along the first direction X, a distance between an inner vertex of an innermost first bent portion and an outer vertex of an outermost first bent portion among the plurality of first bent portions being $W_3$; the second bent region B2 includes a plurality of second bent portions arranged in layers, along the first direction X, a distance between an inner vertex of an innermost second bent portion and an outer vertex of an outermost second bent portion among the plurality of second bent portions being $W_4$; and $(W_3+W_4)/W_2 \leq 30\%$ is satisfied.

"An innermost first bent portion among the plurality of first bent portions" refers to a first bent portion closest to the winding center line of the electrode assembly 2 among the plurality of first bent portions. If an innermost layer of the electrode assembly 2 is the separator 26, the innermost first bent portion is a bent portion of the separator 26. If an innermost layer of the electrode assembly 2 is the positive electrode plate 24, the innermost first bent portion is a bent portion of the positive electrode plate 24. If an innermost layer of the electrode assembly 2 is the negative electrode plate 25, the innermost first bent portion is a bent portion of the negative electrode plate 25.

"An inner vertex of an innermost first bent portion" refers to a point on an inner surface of the innermost first bent portion (that is, a surface facing towards the winding center line of the electrode assembly 2) that is farthest from the winding center line of the electrode assembly 2.

"An innermost second bent portion among the plurality of second bent portions" refers to a second bent portion closest to the winding center line of the electrode assembly 2 among the plurality of second bent portions. If an innermost layer of the electrode assembly 2 is the separator 26, the innermost second bent portion is a bent portion of the separator 26. If an innermost layer of the electrode assembly 2 is the positive electrode plate 24, the innermost second bent portion is a bent portion of the positive electrode plate 24. If an innermost layer of the electrode assembly 2 is the negative electrode plate 25, the innermost second bent portion is a bent portion of the negative electrode plate 25.

"An inner vertex of an innermost second bent portion" refers to a point on an inner surface of the innermost second bent portion (that is, a surface facing towards the winding center line of the electrode assembly 2) that is farthest from the winding center line of the electrode assembly 2.

Since the housing 1 has a right parallelepiped shape, unlike the flat region A, the bent region cannot fully fit the inner surface of the housing 1, resulting in a gap between the two. A larger size of the bent region in the first direction X means a larger gap, and a lower effective utilization rate of the internal space of the housing 1.

In this embodiment, $W_3$ is approximately equal to a size of the first bent region B1 in the first direction X, and $W_4$ is approximately equal to a size of the second bent region B2 in the first direction X. Setting a ratio of a sum of $W_3$ and $W_4$ to $W_2$ to be less than 30% reduces a proportion of the sizes of the first bent region B1 and the second bent region B2 in the first direction X, and increases a proportion of the size of the flat region A in the first direction X, thereby reducing a volume proportion of the gap. Therefore, this improves the effective utilization rate of the internal space of the housing 1 and enhances the volumetric energy density of the battery cell 10.

When $3000\ cm^3 \leq W_1*T_1*H_1 \leq 40000\ cm^3$ and $(W_2*T_2*H_2)/(W_1*T_1*H_1) \geq 80\%$, the volume of the battery cell 10 is large, and the volume of the electrode assembly 2 is also large. Under the same chemical material system, a larger volume of the electrode assembly 2 means a greater mass of the electrode assembly 2. However, when the battery cell 10 experiences a drop or collision, the electrode assembly 2 moves within the housing 1. In this case, an electrode assembly 2 of a larger mass means greater impact on the housing 1.

To enable each wall of the housing 1 to withstand great impact so as to reduce a risk of deformation of the housing 1 and improve reliability of the battery cell 10, in some embodiments of this application, materials of the first wall 101, the second wall 102, the third wall 103, the fourth wall 104, the fifth wall 105, and the sixth wall 106 all include an aluminum alloy, the aluminum alloy including components with the following mass percentages: aluminum≥96.7%, 0.05%≤copper≤0.2%, iron≤0.7%, manganese≤1.5%, silicon≤0.6%, zinc≤0.1%, any other single element component≤0.05%, and a total of other element components≤0.15%.

In this embodiment, controlling mass percentages of various elements within the above ranges can provide an aluminum alloy with higher strength, and using this aluminum alloy as a material for the housing 1 can significantly enhance the ability of the housing 1 to resist impact, thereby improving reliability of the battery cell 10.

Referring to FIG. 7 and FIG. 8, in some embodiments of this application, the housing 1 includes a housing body 11 and an end cap 12, the housing body 11 having an opening, the end cap 12 covering the opening, and the end cap 12 being welded to the housing body 11. The first wall 101, the second wall 102, the third wall 103, the fourth wall 104, and the fifth wall 105 are integrally formed and serve as the housing body 11. The sixth wall 106 is formed separately from the other five walls, the sixth wall 106 serving as the end cap 12. A thickness of the first wall 101 and a thickness of the second wall 102 both are $a_1$, a thickness of the third wall 103 and a thickness of the fourth wall 104 both are $b_1$, a thickness of the fifth wall 105 is $c_1$, and a thickness of the sixth wall 106 being $c_2$, satisfying: $c_2 > c_1$, $c_1 > a_1$, and $c_1 > b_1$.

For a battery cell 10 with only one end cap, the battery cell 10 is typically used with the end cap facing upward or the end cap facing downward. When the battery cell 10 is used with the end cap facing upward, particles inside the battery cell 10 (for example, carbon powder, or metal shavings) settle at the bottom of the housing body (that is, the fifth wall 105) due to gravity, causing corrosion at the bottom of the housing body. After prolonged corrosion, a strength of the bottom of the housing body weakens, which does not facilitate resistance in impact from the electrode assembly 2 or external forces, affecting reliability of the battery cell 10. Therefore, in this embodiment, a larger thickness is designed for the fifth wall 105, making the thickness of the fifth wall 105 greater than the thickness of the first wall 101 and the thickness of the second wall 102, and greater than the thickness of the third wall 103 and the thickness of the fourth wall 104 (that is, $c_1 > a_1$, and $c_1 > b_1$).

Additionally, when $3000 \text{ cm}^3 \leq W_1 * T_1 * H_1 \leq 40000 \text{ cm}^3$ and $(W_2 * T_2 * H_2)/(W_1 * T_1 * H_1) \geq 80\%$, the volume of the battery cell 10 is large, and the volume of the electrode assembly 2 is also large. Under the same chemical material system, a larger volume of the electrode assembly 2 means a larger amount of gas generated during cycling of the battery cell 10, and a larger internal gas pressure of the battery cell 10.

To reduce a risk of tearing of a weld seam between the end cap 12 and the housing body 11 due to increased internal gas pressure, in this embodiment, a larger thickness is designed for the end cap 12, making the thickness of the end cap 12 greater than the thickness of the fifth wall 105 (that is, $c_2 > c_1$), allowing for formation of a wider or thicker weld seam between the end cap 12 and the housing body 11, thereby increasing welding strength, reducing a risk of weld seam tearing, and enhancing reliability of the battery cell 10. Additionally, to form a wider or thicker weld seam, increasing the thickness of the end cap 12 rather than the thickness of the housing body 11 can reduce material usage and lower costs. Increasing the thickness of the housing body 11 means increasing thicknesses of at least four walls: the first wall 101, the second wall 102, the third wall 103, and the fourth wall 104 that are welded to the end cap 12, significantly increasing material usage and costs.

When the first wall 101, the second wall 102, the third wall 103, the fourth wall 104, and the fifth wall 105 are integrally formed and serve as the housing body, and the sixth wall 106 serves as the end cap 12, in some embodiments of this application, an area of the third wall 103 and an area of the fourth wall 104 are greater than an area of the first wall 101 and an area of the second wall 102, and an area of the third wall 103 and an area of the fourth wall 104 are greater than an area of the fifth wall 105 and an area of the sixth wall 106, satisfying: $b_1 < a_1$.

In this embodiment, the third wall 103 and the fourth wall 104 are two walls with the largest area of the housing 1, that is, largest surfaces of the battery cell 10. During cycling of the battery cell 10, a swelling amount of the electrode assembly 2 in a direction of the largest surface is significantly greater than a swelling amount in other directions. To allow swelling of the electrode assembly 2 in a direction of the largest surface, in this embodiment, a small thickness is designed for the third wall 103 and the fourth wall 104, making the thickness of the third wall 103 and the thickness of the fourth wall 104 less than the thickness of the first wall 101 and the thickness of the second wall 102 (that is, $b_1 < a_1$).

When the first wall 101, the second wall 102, the third wall 103, the fourth wall 104, and the fifth wall 105 are integrally formed and serve as the housing body 11, and the sixth wall 106 serves as the end cap 12, in some embodiments of this application, $0.5 \text{ mm} \leq a_1 \leq 1.5 \text{ mm}$, $0.5 \text{ mm} \leq b_1 \leq 1.5 \text{ mm}$, $1.0 \text{ mm} \leq c_1 \leq 2.5 \text{ mm}$, $1.5 \text{ mm} \leq c_2 \leq 4 \text{ mm}$.

$a_1$ may be any value between 0.5 mm and 1.5 mm, for example, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

When $a_1 < 0.5$ mm, the thickness of the first wall 101 and the thickness of the second wall 102 are too small. Since the third wall 103 and the fourth wall 104 are smaller than the first wall 101 and the second wall 102 in thickness, ensuring structural strength of the housing 1 in the third direction Z becomes difficult, and the battery cell 10 is prone to deformation. When $a_1 > 1.5$ mm, the thickness of the first wall 101 and the thickness of the second wall 102 are too large, which is not conducive to increasing the volumetric energy density of the battery cell 10 and increases costs. In this embodiment, setting $a_1$ to 0.5 mm to 1.5 mm can ensure structural strength of the housing 1 in the third direction Z while maintaining the volumetric energy density of the battery cell 10.

$b_1$ may be any value between 0.5 mm and 1.5 mm, for example, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

When $b_1 < 0.5$ mm, the thickness of the third wall 103 and the thickness of the fourth wall 104 are too small, and when the electrode assembly 2 swells, the third wall 103 and the fourth wall 104 are easily squeezed and ruptured. When $b_1 > 1.5$ mm, the third wall 103 and the fourth wall 104 have a large thickness, and high structural strength and rigidity, making it difficult to absorb swelling of the electrode assembly 2. This leads to stress concentration inside the electrode assembly 2, causing a "lithium precipitation" phenomenon and resulting in cycle life degradation. In this embodiment, setting $b_1$ to 0.5 mm to 1.5 mm ensures that structural strength and rigidity of the third wall 103 and the fourth wall 104 are moderate, allowing for swelling of the electrode assembly 2 without being squeezed and ruptured by the electrode assembly 2.

$c_1$ may be any value between 1.0 mm and 2.5 mm, for example, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, or 2.5 mm.

When $c_1$<1.0 mm, the thickness of the fifth wall 105 is too small, and after prolonged corrosion by particles deposited thereon, a residual thickness of the fifth wall 105 becomes even smaller, making it difficult for the fifth wall 105 to resist impact from the electrode assembly 2 when the electrode assembly 2 moves within the housing 1, thereby easily leading to rupture. When $c_1$>2.5 mm, the thickness of the fifth wall 105 is too large, which is not conducive to increasing the volumetric energy density of the battery cell 10 and increases costs. In this embodiment, setting $c_1$ to 1.0 mm to 2.5 mm can ensure the ability of the fifth wall 105 to resist impact from the electrode assembly 2 while maintaining the volumetric energy density of the battery cell 10.

When the first wall 101, the second wall 102, the third wall 103, the fourth wall 104, and the fifth wall 105 are integrally formed and serve as the housing body 11, and the sixth wall 106 serves as the end cap 12, electrode terminals may be disposed on the end cap 12 or on the fifth wall 105. The electrode terminals are electrically connected to the electrode assembly 2.

When the first wall 101, the second wall 102, the third wall 103, the fourth wall 104, and the fifth wall 105 are integrally formed and serve as the housing body, and the sixth wall 106 serves as the end cap, to further increase the proportion of the volume of the internal space of the housing 1 and enhance the volumetric energy density of the battery cell 10, in some embodiments of this application, $(W_1-2*a_1)*(T_1-2*b_1)*(H_1-c_1-c_2)/(W_1*T_1*H_1) \geq 95\%$.

Referring to FIG. 10 to FIG. 12, in some embodiments of this application, the housing 1 includes a housing body 11 and two end caps 12, the housing body 11 having two openings disposed opposite each other along the third direction Z, the two end caps 12 respectively covering the openings on corresponding sides, and the end caps 12 being welded to the housing body 11. The first wall 101, the second wall 102, the third wall 103, and the fourth wall 104 are integrally formed and serve as the housing body 11, and the fifth wall 105 and the sixth wall 106 serves as the two end caps 12, respectively. The thickness of the first wall 101 and the thickness of the second wall 102 both are $a_1$, the thickness of the third wall 103 and the thickness of the fourth wall 104 both are $b_1$, the thickness of the fifth wall 105 is $c_1$, and the thickness of the sixth wall 106 is $c_2$, satisfying: $c_1=c_2$, $c_1>a_1$, and $c_2>b_1$.

In this embodiment, with the thickness of the fifth wall 105 and the thickness of the sixth wall 106 set to be equal (that is, $c_1=c_2$), the two end caps 12 required for the battery cell 10 can be produced by using a same mold, reducing the number of molds and lowering production costs.

For a battery cell 10 with two end caps 12, to reduce a risk of tearing of a weld seam between the end caps 12 and the housing body 11 caused by increased internal gas pressure, in this embodiment, a thickness of the end caps 12 is designed to be thicker, making the thickness of the end caps 12 greater than the thickness of the first wall 101 and the thickness of the second wall 102, and greater than the thickness of the third wall 103 and the thickness of the fourth wall 104 (that is, $c_1>a_1$, $c_1>b_1$, $c_2>a_1$, and $c_2>b_1$), allowing for formation of a wider or thicker weld seam between the end caps 12 and the housing body 11. Therefore, this increases the welding strength, reduces a risk of weld seam tearing, and enhances reliability of the battery cell 10. Additionally, to form a wider or thicker weld seam, increasing the thickness of the end caps 12 rather than the thicknesses of the first wall 101, the second wall 102, the third wall 103, and the fourth wall 104 can reduce material usage and lower costs.

When the first wall 101, the second wall 102, the third wall 103, and the fourth wall 104 are integrally formed and serve as the housing body 11, and the fifth wall 105 and the sixth wall 106 serve as the end caps 12, respectively, in some embodiments of this application, an area of the third wall 103 and an area of the fourth wall 104 are greater than an area of the first wall 101 and an area of the second wall 102, and an area of the third wall 103 and an area of the fourth wall 104 are greater than an area of the fifth wall 105 and an area of the sixth wall 106, satisfying: $b_1<a_1$.

In this embodiment, the third wall 103 and the fourth wall 104 are two walls with the largest area of the housing 1, that is, largest surfaces of the battery cell 10. Typically, during cycling of the battery cell 10, a swelling amount of the electrode assembly 2 in a direction of the largest surface is significantly greater than a swelling amount in other directions. To allow swelling of the electrode assembly 2 in a direction of the largest surface, in this embodiment, a small thickness is designed for the third wall 103 and the fourth wall 104, making the thickness of the third wall 103 and the thickness of the fourth wall 104 less than the thickness of the first wall 101 and the thickness of the second wall 102 (that is, $b_1<a_1$).

When the first wall 101, the second wall 102, the third wall 103, and the fourth wall 104 are integrally formed and serve as the housing body 11, and the fifth wall 105 and the sixth wall 106 serve as the end caps 12, respectively, in some embodiments of this application, 0.5 mm$\leq a_1 \leq$1.5 mm, 0.5$\leq b_1 \leq$1.5 mm, and 1.5 mm$\leq c_1 \leq$4 mm.

$a_1$ may be any value between 0.5 mm and 1.5 mm, for example, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

When $a_1$<0.5 mm, the thickness of the first wall 101 and the thickness of the second wall 102 are too small. Since the thickness of the third wall 103 and the thickness of the fourth wall 104 are smaller than the thickness of the first wall 101 and the thickness of the second wall 102, ensuring structural strength of the housing 1 in the third direction Z becomes difficult, and the battery cell 10 is prone to deformation. When $a_1$>1.5 mm, the thickness of the first wall 101 and the thickness of the second wall 102 are too large, which is not conducive to increasing the volumetric energy density of the battery cell 10 and increases costs. In this embodiment, setting $a_1$ to 0.5 mm to 1.5 mm can ensure structural strength of the housing 1 in the third direction Z while maintaining the volumetric energy density of the battery cell 10.

$b_1$ may be any value between 0.5 mm and 1.5 mm, for example, 0.5 mm, 0.6 mm, 0.7 mm, 0.8 mm, 0.9 mm, 1.0 mm, 1.1 mm, 1.2 mm, 1.3 mm, 1.4 mm, or 1.5 mm.

When $b_1$<0.5 mm, the thickness of the third wall 103 and the thickness of the fourth wall 104 are too small, and when the electrode assembly 2 swells, the third wall 103 and the fourth wall 104 are easily squeezed and ruptured. When $b_1$>1.5 mm, the third wall 103 and the fourth wall 104 have a large thickness, and high structural strength and rigidity, making it difficult to absorb swelling of the electrode assembly 2. This leads to stress concentration inside the electrode assembly 2, causing a "lithium precipitation" phenomenon and resulting in cycle life degradation. In this embodiment, setting $b_1$ to 0.5 mm to 1.5 mm ensures that structural strength and rigidity of the third wall 103 and the fourth wall 104 are moderate, allowing for swelling of the electrode assembly 2 without being squeezed and ruptured by the electrode assembly 2.

$c_1$ and $c_2$ may be any value between 1.5 mm and 4.0 mm, for example, 1.5 mm, 1.6 mm, 1.7 mm, 1.8 mm, 1.9 mm, 2.0 mm, 2.1 mm, 2.2 mm, 2.4 mm, 2.6 mm, 2.8 mm, 3.0 mm, 3.2 mm, 3.5 mm, 3.8 mm, or 4.0 mm.

When $c_1$ and $c_2$ are less than 1.5 mm, the thickness of the end cap 12 is too small, and after prolonged corrosion by particles deposited thereon, a residual thickness of the end cap 12 becomes even smaller, making it difficult for the end cap 12 to resist impact from the electrode assembly 2 when the electrode assembly 2 moves within the housing 1, thereby easily leading to rupture. When $c_1$ and $c_2$ are greater than 4 mm, the thickness of the end cap 12 is too large, which is not conducive to increasing the volumetric energy density of the battery cell 10 and increases costs. In this embodiment, setting $c_1$ and $c_2$ to 1.5 mm to 4 mm can ensure the ability of the end caps to resist impact from the electrode assembly 2 while maintaining the volumetric energy density of the battery cell 10.

When the first wall 101, the second wall 102, the third wall 103, and the fourth wall 104 are integrally formed and serve as the housing body 11, and the fifth wall 105 and the sixth wall 106 serve as the end caps 12, respectively, electrode terminals are disposed on the end caps 12, the electrode terminals being electrically connected to the electrode assembly 2. Further, a positive electrode terminal 121 may be disposed on one end cap 12, and a negative electrode terminal 122 may be disposed the other end cap 12.

When the first wall 101, the second wall 102, the third wall 103, and the fourth wall 104 are integrally formed and serve as the housing body 11, and the fifth wall 105 and the sixth wall 106 serve as the end caps 12, respectively, to further increase the proportion of the volume of the internal space of the housing 1 and enhance the volumetric energy density of the battery cell 10, in some embodiments of this application, $(W_1-2*a_1)*(T_1-2*b_1)*(H_1-2*c_1)/(W_1*T_1*H_1) \geq 95\%$.

In some embodiments of this application, $W_1$, $T_1$, and $H_1$ satisfy: $T_1 < W_1$, and $T_1 < H_1$, that is, the third wall 103 and the fourth wall 104 are two walls with the largest area of the housing 1.

In this embodiment, the thickness of the battery cell 10 is less than the width and the height of the battery cell 10, the battery cell 10 being flat. The electrode assembly is also flat, a thickness direction of the electrode assembly 2 being the same as a thickness direction of the battery cell 10. For a laminated electrode assembly 2, the thickness direction of the electrode assembly 2 is a stacking direction of electrode plates. For a wound electrode assembly 2, the body 21 of the electrode assembly 2 includes a flat region A, a first bent region B1, and a second bent region B2, and the thickness direction of the electrode assembly 2 is a stacking direction of electrode plates in the flat region A.

Whether a laminated electrode assembly or a wound electrode assembly, the thickness of the electrode assembly 2 cannot be too large. An excessively large thickness prevents heat from inner electrode plates from dissipating outward in time, causing an excessively high temperature of the inner electrode plates, easily leading to thermal runaway. Since the thickness of the electrode assembly 2 cannot be too large, the thickness of the battery cell 10 cannot be too large either.

Given a limited thickness of the battery cell 10, to ensure that the volume of the battery cell 10 can be greater than 3000 cm$^3$, in some embodiments of this application, the width and the height of the battery cell 10 are both at least twice the thickness of the battery cell 10, that is, $W_1/T_1 \geq 2$, and $H_1/T_1 \geq 2$.

However, when the width of the battery cell 10 exceeds ten times the thickness, or the height exceeds ten times the thickness, the battery cell 10 becomes a long and thin cuboid, featuring insufficient overall rigidity, making it prone to deformation. Therefore, in some embodiments of this application, $W_1$, $T_1$, and $H_1$ satisfy: $2 \leq W_1/T_1 \leq 10$, and $2 \leq H_1/T_1 \leq 10$. This can ensure that the battery cell 10 has a large volume and the battery cell 10 has a great overall rigidity and insusceptibility to deformation.

In some embodiments of this application, $W_1$ and $H_1$ satisfy: $0.7 \leq W_1/H_1 \leq 1.6$.

When $W_1/H_1 < 0.7$, the width of the battery cell 10 is much smaller than the height, and as two walls with the largest area of the housing 1, the third wall 103 and the fourth wall 104 are narrow and long plates, making it difficult to ensure structural strength and rigidity of the battery cell 10 in the width direction. When the first wall 101 and/or the second wall 102 are subjected to an external force along the width direction of the battery cell 10, the third wall 103 and the fourth wall 104 are prone to bending and deformation.

When $W_1/H_1 > 1.6$, the width of the battery cell 10 is much greater than the height, and as two walls with the largest area of the housing 1, the third wall 103 and the fourth wall 104 are narrow and long plates, making it difficult to ensure structural strength and rigidity of the battery cell 10 in the height direction. When the fifth wall 105 and/or the sixth wall 106 are subjected to an external force along the height direction of the battery cell 10, the third wall 103 and the fourth wall 104 are prone to bending and deformation.

In this embodiment, setting the ratio of $W_1$ to $H_1$ between 0.7 and 1.6 makes the width and the height of the battery cell 10 relatively close, thereby enhancing structural strength and rigidity of the battery cell 10 in the width direction and the height direction, reducing a likelihood of deformation of the battery cell 10.

$W_1/H_1$ may be any value between 0.7 and 1.6, for example, 0.7, 0.8, 0.9, 1.0, 1.1, 1.2, 1.3, 1.4, 1.5, or 1.6.

In some embodiments of this application, 40 mm $\leq T_1 \leq$ 150 mm. $T_1$ may be any value between 40 mm and 150 mm, for example, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, or 150 mm.

When $T_1 < 40$ mm, to satisfy $(T_1-b)/T_1 \geq 96.5\%$, the value of b needs to be set very small. However, when the value of b is too small, ensuring structural strength and rigidity of the third wall 103 and the fourth wall 104 becomes difficult.

When $T_1 > 150$ mm, a heat dissipation path of inner electrode plates of the electrode assembly 2 becomes too long, preventing heat from the inner electrode plates from dissipating outward in time, causing an excessively high temperature of the inner electrode plates, easily leading to thermal runaway.

In this embodiment, setting $T_1$ between 40 mm and 150 mm can allow an increase in the proportion of then internal space of the housing 1 in the thickness direction of the battery cell 10, enhancing the volumetric energy density of the battery cell 10, and can ensure timely heat dissipation of the inner electrode plates of the electrode assembly 2.

In some embodiments of this application, the height direction of the battery cell 10 is parallel to a direction of gravity, the battery cell 10 includes an electrolyte, and 120 mm $\leq H_1 \leq$ 400 mm. $H_1$ may be any value between 120 mm and 400 mm, for example, 120 mm, 130 mm, 140 mm, 150 mm, 160 mm, 170 mm, 180 mm, 190 mm, 200 mm, 210 mm, 220 mm, 230 mm, 240 mm, 250 mm, 260 mm, 270 mm, 280 mm, 290 mm, 300 mm, 310 mm, 320 mm, 330 mm, 340 mm, 350 mm, 360 mm, 370 mm, 380 mm, 390 mm, or 400 mm.

When $H_1 < 120$ mm, to satisfy $(H_1-c)/H_1 \geq 96.5\%$, the value of c needs to be set very small. However, since the fifth wall 105 and/or the sixth wall 106 are end caps, if the value of c is too small, a weld seam between the end cap and the housing body is small, making it difficult to ensure welding strength.

When $H_1 > 400$ mm, the heights of the battery cell 10 and the electrode assembly 2 are too large. Since the height direction of the battery cell 10 is parallel to the direction of gravity, an excessively large height of the electrode assembly 2 makes it difficult for the electrolyte to reach the top of the electrode assembly 2, preventing the top of the electrode assembly 2 from being fully wetted by the electrolyte and rendering it unable to function, thereby reducing the energy density of the battery cell 10.

In this embodiment, setting $H_1$ between 120 mm and 400 mm can allow an increase in a proportion of an internal space of the housing 1 in a height direction of the battery cell 10, enhancing the volumetric energy density of the battery cell 10, and can also ensure that a top of the electrode assembly 2 can be fully wetted by the electrolyte.

In some embodiments of this application, 150 mm $\leq W_1 \leq$ 1500 mm. $W_1$ may be any value between 150 mm and 1500 mm, for example, 150 mm, 200 mm, 250 mm, 300 mm, 350 mm, 400 mm, 450 mm, 500 mm, 550 mm, 600 mm, 650 mm, 700 mm, 750 mm, 800 mm, 850 mm, 900 mm, 950 mm, 1000 mm, 1050 mm, 1100 mm, 1150 mm, 1200 mm, 1250 mm, 1300 mm, 1350 mm, 1400 mm, 1450 mm, or 1500 mm.

When $W_1 < 150$ mm, to satisfy $(W_1-a)/W_1 \geq 97.0\%$, a very small value needs to be set for a. However, when the value of a is too small, ensuring structural strength and rigidity of the first wall 101 and the second wall 102 becomes difficult. Additionally, limited by heat dissipation of the electrode assembly 2, $T_1$ cannot be too large, and limited by wetting of the electrode assembly 2, $H_1$ cannot be too large. If $T_1$ is also relatively small, the volume of the battery cell 10 being greater than or equal to 3000 cm³ cannot be satisfied, making it difficult to ensure the volumetric energy density of the battery cell 10.

When $W_1 > 1500$ mm, due to limitations on $T_1$ and $H_1$, a significant difference arises between $W_1$ and $T_1$, and between $W_1$ and $H_1$, making the battery cell 10 an elongated cuboid structure on the whole with insufficient overall structural strength and rigidity.

In this embodiment, setting $W_1$ between 150 mm and 1500 mm can allow an increase in a proportion of an internal space of the housing 1 in a width direction of the battery cell 10, enhancing the volumetric energy density of the battery cell 10, and can also ensure overall structural strength and rigidity of the battery cell 10.

In some embodiments of this application, the battery cell 10 is a lithium-ion battery, a positive electrode active material of the battery cell 10 includes lithium-containing phosphate, and a capacity of the battery cell 10 is C, satisfying: $C \geq 350$ Ah, and $C/((W_1-a)*(T_1-b)*(H_1-c)) \geq 118$ Ah/L. As specific examples, the lithium-containing phosphate may include, but is not limited to, one or more of lithium iron phosphate, lithium manganese phosphate, lithium cobalt phosphate, and lithium nickel phosphate.

In some embodiments of this application, a positive electrode active material of the battery cell 10 includes a lithium transition metal oxide, and a capacity of the battery cell 10 is C, satisfying: $C \geq 650$ Ah, and $C/((W_1-a)*(T_1-b)*(H_1-c)) \geq 190$ Ah/L. As specific examples, the lithium transition metal oxide may include, but is not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, and lithium nickel cobalt aluminum oxide.

In some embodiments of this application, the battery cell 10 is a sodium-ion battery, and a capacity of the battery cell 10 is C, satisfying: $C \geq 260$ Ah, and $C/((W_1-a)*(T_1-b)*(H_1-c)) \geq 87$ Ah/L.

The embodiments of this application provide a battery 100 including a battery casing 20 and the battery cell 10 provided in any one of the above embodiments, the battery cell 10 being accommodated within the battery casing 20.

The embodiments of this application provide an electric apparatus including the battery provided in any one of the above embodiments.

The embodiments of this application provide an energy storage apparatus 2000 including an energy storage casing 400 and the battery cell 10 provided in any one of the above embodiments, the energy storage casing 400 including a battery compartment 401, and the battery cell 10 being accommodated within the battery compartment 401.

In some embodiments of this application, a sum of volumes of the plurality of battery cells 10 is $V_1$, and a volume of the battery compartment 401 is $V_2$, satisfying: $0.5 \leq V_1/V_2 \leq 0.95$. $V_1/V_2$ may be any value between 0.5 and 0.95, for example, 0.5, 0.55, 0.6, 0.65, 0.7, 0.75, 0.8, 0.85, 0.9, or 0.95.

$V_1$ is the sum of the volumes of all battery cells 10 within the battery compartment. If the volumes of all battery cells 10 within the battery compartment 401 are equal, $V_1$ is a product of the volume of each battery cell 10 and the number of the battery cells 10. $V_2$ is a volume of a three-dimensional space defined by the inner contour of the battery compartment 401. In the energy storage apparatus 2000, $V_1/V_2$ may be defined as a space utilization rate.

In this embodiment, defining the ratio of the sum of volumes of the battery cells 10 to the volume of the battery compartment, that is, $V_1/V_2 \geq 0.5$, can increase the space utilization rate of the energy storage apparatus 2000, allowing more battery cells 10 to be arranged within the battery compartment 401 of the energy storage casing 400, that is, arranging more energy-providing structures per unit space. This can increase the energy density and enhance the capacity without expanding an occupied space.

In some embodiments of this application, the ratio of the sum of the volumes of the plurality of battery cells 10 to the volume of the battery compartment 401 satisfies: $V_1/V_2 \geq 0.55$.

In some embodiments of this application, the ratio of the sum of the volumes of the plurality of battery cells 10 to the volume of the battery compartment 401 satisfies: $V_1/V_2 \geq 0.65$.

In some embodiments of this application, the ratio of the sum of the volumes of the plurality of battery cells 10 to the volume of the battery compartment 401 satisfies: $V_1/V_2 \geq 0.75$.

Those skilled in the art can understand that, due to other components including a liquid cooling system, a control system, wiring harnesses, and the like used in conjunction with the battery cells 10 occupying an internal space of the battery compartment, a peak value of $V_1/V_2$ is typically 95%, that is, $V_1/V_2 \leq 95\%$.

It should be noted that in the absence of conflict, the embodiments in this application and features within the embodiments may be combined with each other.

The above embodiments are only used to illustrate technical solutions of this application and are not intended to limit this application; for those skilled in the art, various modifications and changes may be made to this application. Any modifications, equivalent replacements, and improvements made without departing from the spirit and principle of this application shall fall within the protection scope of this application.

What is claimed is:

1. A battery cell, a housing thereof having a volume greater than or equal to 3000 cm$^3$, the housing being a right parallelepiped, the housing comprising a housing body and two end caps, the housing body comprising a first wall, a second wall, a third wall, and a fourth wall integrally formed, the first wall and the second wall being disposed opposite each other along a first direction, the third wall and the fourth wall being disposed opposite each other along a second direction, the housing body having two openings disposed opposite each other along a third direction, each of the two end caps covering the opening on a corresponding side, each end cap being welded to the housing body, and the first direction, the second direction, and the third direction being mutually perpendicular, wherein the battery cell comprises:
electrode terminals disposed on the end caps;
at least one electrode assembly, wherein the electrode assembly is accommodated within the housing, the electrode assembly comprising a body and tabs extending from the body, and the tabs being electrically connected to the electrode terminals;
a third insulating member and a fourth insulating member, the third insulating member being disposed between one of the end caps and the electrode assembly and abutting against the one of the end caps, and the fourth insulating member being disposed between the other of the end caps and the electrode assembly and abutting against the other of the end caps; and
an electrolyte, wherein the electrolyte is accommodated within the housing; and, wherein
a size of the housing in the first direction is denoted as $W_1$, a size of the housing in the second direction is denoted as $T_1$, a size of the housing in the third direction is denoted as $H_1$, a sum of thicknesses of the first wall and the second wall is denoted as a, a sum of thicknesses of the third wall and the fourth wall is denoted as b, and a sum of thicknesses of the two end caps is denoted as c, satisfying: $(W_1-a)*(T_1-b)*(H_1-c)/(W_1*T_1*H_1) \geq 90\%$, 40 mm$\leq T_1 \leq$150 mm, 120 mm$\leq H_1 \leq$400 mm, and 150 mm$\leq W_1 \leq$1500 mm,
wherein the thickness of the first wall and the thickness of the second wall are both denoted as $a_1$, the thickness of the third wall and the thickness of the fourth wall are both denoted as $b_1$, and the thicknesses of the two end caps are respectively denoted as $c_1$ and $c_2$, satisfying: $c_1 > a_1$, and $c_1 > b_1$, 0.5 mm$\leq a_1 \leq$1.5 mm, 0.8 mm$\leq b_1 \leq$1.5 mm, and 1.5 mm$\leq c_2 \leq$4 mm,
wherein a maximum size of the third insulating member in the third direction is denoted as $d_3$, and a maximum size of the fourth insulating member in the third direction is denoted as $d_4$, satisfying: 2 mm$\leq d_3 <$10 mm, and 2 mm$\leq d_4 \leq$10 mm.

2. The battery cell according to claim 1, wherein $(W_1-a)*(T_1-b)*(H_1-c)/(W_1*T*H_1) \geq 92\%$.

3. The battery cell according to claim 1, wherein $(W_1-a)/W_1 \geq 97.0\%$, $(T_1-b)/T_1 \geq 96.5\%$, and $(H_1-c)/H_1 \geq 96.5\%$.

4. The battery cell according to claim 1, wherein $d_3$ and $d_4$ satisfy: $(W_1-a-1.6$ mm$)*(T_1-b-1.6$ mm$)*(H_1-c-d_3-d_4)/(W_1*T_1*H_1) \geq 88\%$.

5. The battery cell according to claim 1, wherein $d_3$ and $d_4$ satisfy: $(W_1-a-4$ mm$)*(T_1-b-4$ mm$)*(H_1-c-d_3-d_4)/(W_1*T_1*H_1) \geq 85\%$, the third insulating member and the fourth insulating member are plastic pieces.

6. The battery cell according to claim 1, wherein 400 mm$\leq W_1 \leq$1500 mm, $W_1*T_1*H_1 \leq$40000 cm$^3$.

7. The battery cell according to claim 6, wherein 3200 cm$^3 \leq W_1*T_1*H_1 \leq$32000 cm$^3$.

8. The battery cell according to claim 7, wherein 3720 cm$^3 \leq W_1*T_1*H_1 \leq$12500 cm$^3$.

9. The battery cell according to claim 8, wherein 4000 cm$^3 \leq W_1*T_1*H_1 \leq$6000 cm$^3$.

10. The battery cell according to claim 1, wherein the body is a flat body; and
one electrode assembly is provided, a maximum size of the body in the first direction is denoted as $W_2$, a maximum size of the body in the second direction is denoted as $T_2$, and a maximum size of the body in the third direction is denoted as $H_2$, satisfying: $(W_2*T_2*H_2)/(W_1*T_1*H_1) \geq 80\%$; or
a plurality of electrode assemblies are provided, a maximum size in the first direction of a unified whole composed of the bodies of the plurality of electrode assemblies is $W_2$, a maximum size in the second direction of the unified whole composed of the bodies of the plurality of electrode assemblies is $T_2$, and a maximum size in the third direction of the unified whole composed of the bodies of the plurality of electrode assemblies is $H_2$, satisfying: $(W_2*T_2*H_2)/(W_1*T_1*H_1) \geq 80\%$.

11. The battery cell according to claim 10, wherein $W_2/(W_1-a) \geq 91.5\%$, $T_2/(T_1-b) \geq 93.2\%$, and $H_2/(H_1-c) \geq 94.0\%$.

12. The battery cell according to claim 10, wherein the electrode assembly is a wound structure, and the body comprises a flat region, a first bent region, and a second bent region, along the first direction, the first bent region and the second bent region being located at two ends of the flat region, respectively; wherein
the first bent region comprises a plurality of first bent portions arranged in layers, along the first direction, a distance between an inner vertex of an innermost first bent portion and an outer vertex of an outermost first bent portion among the plurality of first bent portions being $W_3$;
the second bent region comprises a plurality of second bent portions arranged in layers, along the first direction, a distance between an inner vertex of an innermost second bent portion and an outer vertex of an outermost second bent portion among the plurality of second bent portions being $W_4$; and
$(W_3+W_4)/W_2 \leq 30\%$ is satisfied.

13. The battery cell according to claim 1, wherein materials of the first wall, the second wall, the third wall, the fourth wall, and the end caps all comprise an aluminum alloy, the aluminum alloy comprising components in the following mass percentages: aluminum$\geq$96.7%, 0.05%$\leq$copper$\leq$0.2%, iron$\leq$0.7%, manganese$\leq$1.5%, silicon$\leq$0.6%, zinc$\leq$0.1%, any other single element component$\leq$0.05%, and a total of other element components$\leq$0.15%.

14. The battery cell according to claim 1, wherein $(W_1-2*a_1)*(T_1-2*b_1)*(H_1-2*c_1)/(W_1*T_1*H_1) \geq 95\%$ is satisfied.

15. The battery cell according to claim 1, wherein $T_1 < W_1$, and $T_1 < H_1$, and $2 \leq W_1/T_1 \leq 10$, $2 \leq H_1/T_1 \leq 10$, and/or $0.7 \leq W_1/H_1 \leq 1.6$.

16. The battery cell according to claim 1, wherein a positive electrode material of the battery cell comprises lithium-containing phosphate, and a capacity of the battery cell is denoted as C, satisfying: $C \geq 350$ Ah, and $C/((W_1-a)*(T_1-b)*(H_1-c)) \geq 118$ Ah/L.

17. The battery cell according to claim 1, wherein a positive electrode material of the battery cell comprises lithium transition metal oxide, and a capacity of the battery cell is denoted as C, satisfying: $C \geq 650$ Ah, and $C/((W_1-a)*(T_1-b)*(H_1-c)) \geq 190$ Ah/L.

18. The battery cell according to claim 1, wherein the battery cell is a sodium-ion battery, and a capacity of the battery cell is denoted as C, satisfying: $C \geq 260$ Ah, and $C/((W_1-a)*(T_1-b)*(H_1-c)) \geq 87$ Ah/L.

19. A battery, characterized by comprising the battery cell according to claim 1.

20. An electric apparatus comprising the battery according to claim 19, wherein the battery is configured to provide electric energy to the electric apparatus.

\* \* \* \* \*